(12) United States Patent
Kirilin et al.

(10) Patent No.: US 12,030,036 B2
(45) Date of Patent: Jul. 9, 2024

(54) METHODS FOR PRODUCING $C_2$ TO $C_5$ PARAFFINS USING A HYBRID CATALYST COMPRISING GALLIUM METAL OXIDE

(71) Applicant: Dow Global Technologies LLC, Midland, MI (US)

(72) Inventors: Alexey Kirilin, Terneuzen (NL); Adam Chojecki, Ghent (BE); Glenn Pollefeyt, Wondelgem (BE); Davy L. S. Nieskens, Terneuzen (NL); Kyle C. Andrews, Midland, MI (US); Vera P. Santos Castro, Terneuzen (NL); Joseph F. DeWilde, Midland, MI (US); David F. Yancey, Midland, MI (US); Andrzej Malek, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 455 days.

(21) Appl. No.: 17/417,955

(22) PCT Filed: Dec. 16, 2019

(86) PCT No.: PCT/US2019/066532
§ 371 (c)(1),
(2) Date: Jun. 24, 2021

(87) PCT Pub. No.: WO2020/139600
PCT Pub. Date: Jul. 2, 2020

(65) Prior Publication Data
US 2022/0088574 A1 Mar. 24, 2022

Related U.S. Application Data

(60) Provisional application No. 62/785,831, filed on Dec. 28, 2018.

(51) Int. Cl.
| | |
|---|---|
| *B01J 23/08* | (2006.01) |
| *B01J 21/06* | (2006.01) |
| *B01J 23/62* | (2006.01) |
| *B01J 23/825* | (2006.01) |
| *B01J 29/85* | (2006.01) |
| *B01J 35/00* | (2024.01) |
| *C10G 2/00* | (2006.01) |

(52) U.S. Cl.
CPC ............ *B01J 23/08* (2013.01); *B01J 21/063* (2013.01); *B01J 21/066* (2013.01); *B01J 23/62* (2013.01); *B01J 23/825* (2013.01); *B01J 29/85* (2013.01); *B01J 35/19* (2024.01); *C10G 2/33* (2013.01); *C10G 2/333* (2013.01); *C10G 2/334* (2013.01)

(58) Field of Classification Search
CPC . C10G 2/33; C10G 2/333; C10G 2/234; B01J 23/08; B01J 21/063; B01J 21/066; B01J 23/62; B01J 23/825; B01J 29/85
See application file for complete search history.

(56) References Cited

U.S. PATENT DOCUMENTS

| | | | |
|---|---|---|---|
| 4,440,871 | A | 4/1984 | Lok et al. |
| 4,487,851 | A | 12/1984 | Heyward et al. |
| 2013/0253078 | A1 | 9/2013 | Jothimurugesan et al. |

FOREIGN PATENT DOCUMENTS

| | | |
|---|---|---|
| CN | 102245541 A | 11/2011 |
| CN | 105396571 A | 3/2016 |
| CN | 108262055 B | 3/2021 |
| EP | 0070690 A1 | 1/1983 |
| EP | 3901119 A1 | 10/2021 |
| WO | 2010068364 A2 | 6/2010 |
| WO | 2012122057 A2 | 9/2012 |
| WO | 2016007607 A1 | 1/2016 |
| WO | 2017074558 A1 | 5/2017 |
| WO | 2018120576 A1 | 7/2018 |

OTHER PUBLICATIONS

Communication pursuant to Article 94(3), dated Aug. 3, 2022, pertaining to EP Application No. 19848912.2, 6 pages.
Saudi Arabian Examination Report dated Mar. 22, 2023, pertaining to Saudi Arabian Patent Application No. 521422407 14 pages.
Chinese Office Action dated Jun. 16, 2023, pertaining to Chinese Patent Application No. 201980089977.6 8 pages.
Liu et al., "Selective transformation of carbon dioxide into lower olefins with a bifunctional catalyst composed of ZnGa2O4 and SAPO-34", Chemical Communications, 2018, 54, 140.
International Search Report and Written Opinion pertaining to PCT/US2019/066532, dated Jun. 29, 2020.
D. Freeman, R.P.K. Wells, G.J. Hutchings, Conversion of Methanol to Hydrocarbons over Ga2O3/H-ZSM-5 and Ga2O3/WO3 Catalysts, Journal of Catalysis, 2002, vol. 205, 358.
T. Fujitani, M. Saito, Y. Kanai, T. Watanabe, J. Nakamura, T. Uchijima, Development of an active Ga2O3 supported palladium catalyst for the synthesis of methanol from carbon dioxide and hydrogen, Applied Catalysis A: General, 1995, vol. 125, L199.
O. Oyola-Rivera, M.A. Baltanas, N. Cardona-Martinez, CO2 hydrogenation to methanol and dimethyl ether by Pd-Pd2Ga catalysts supported over Ga2O3 polymorphs, J of CO2 utilization 9 (2015) 8-15.

(Continued)

*Primary Examiner* — Jafar F Parsa
(74) *Attorney, Agent, or Firm* — Dinsmore & Shohl LLP

(57) ABSTRACT

A method for preparing $C_2$ to $C_5$ paraffins includes introducing a feed stream including hydrogen gas and a carbon-containing gas selected from carbon monoxide, carbon dioxide, and mixtures thereof into a reaction zone of a reactor. Converting the feed stream into a product stream including $C_2$ to $C_5$ paraffins in the presence of a hybrid catalyst. The hybrid catalyst includes a microporous catalyst component; and a metal oxide catalyst component selected from (A) a bulk material consisting of gallium oxide, (B) gallium oxide present on a titanium dioxide support material, and (C) a mixture of gallium oxide and at least one promoter present on a support material selected from Group 4 of the IUPAC periodic table of elements.

16 Claims, No Drawings

(56) References Cited

OTHER PUBLICATIONS

F. Studt, I. Sharafutdinov, F. Abild-Pedersen, C.F. Elkjær, J.S. Hummelshøj, S. Dahl, I. Chorkendorff, J.K. Nørskov, Discovery of a Ni-Ga catalyst for carbon dioxide reduction to methanol, Nat Chem, 2014, vol. 6, 320.
I. Sharafutdinov, I. Chorkendorff et al., Intermetallic compounds of Ni and Ga as catalysts for the synthesis of methanol, J of Catal, 320 (2014) 77-88.
C.L. Chiang, K.S. Lin, Y.G. Lin, Preparation and characterization of Ni5Ga3 for Methanol Formation via CO2 hydrogenation, Top Catal, 10.1007/s11244-017-0771-7 (Published on Apr. 10, 2017).
S.K. Ihm, S.W. Baek, Y.K. Park, J.K. Jeon, "CO2 Hydrogenation over Copper-Based Hybrid Catalysts for the Synthesis of Oxygenates" in Utilization of Greenhouse Gases, vol. 852, American Chemical Society, 2003, pp. 183.
Chinese Office Action dated Sep. 16, 2022, pertaining to Chinese Patent Application No. 201980089977.6, 4 pages.
Chinese Search Report dated Sep. 16, 2022, pertaining to Chinese Patent Application No. 201980089977.6, 2 pages.
Brazil Office Action dated Sep. 8, 2023, pertaining to BR Patent Application No. BR112021012828.0, 7 pgs.
Chinese Office Action dated Oct. 8, 2023, pertaining to CN Patent Application No. 201980089977.6, 6 pgs.
Saudi Arabia Substantive Examination Report dated Oct. 10, 2023, pertaining to SA Patent Application No. 521422407, 7 pgs.
Argentina Office Action dated Dec. 26, 2023, pertaining to AR Patent Application No. 20190103720, 2 pgs.

METHODS FOR PRODUCING $C_2$ TO $C_5$ PARAFFINS USING A HYBRID CATALYST COMPRISING GALLIUM METAL OXIDE

CROSS-REFERENCE TO RELATED APPLICATIONS

This application is a National Stage Entry under 35 U.S.C. § 371 of International Patent Application No. US2019/066532, filed Dec. 16, 2019, which claims priority to U.S. Provisional Patent Application No. 62/785,831, filed on Dec. 28, 2018, the entire disclosures of which are hereby incorporated by reference.

BACKGROUND

Field

The present specification generally relates to catalysts that comprise a gallium metal oxide component and methods that efficiently convert various carbon-containing streams to $C_2$ to $C_5$ paraffins. In particular, the present specification relates to hybrid catalysts comprising gallium and methods to achieve a high conversion of synthesis gas feeds resulting in good conversion of carbon and high yield of desired products. The synthesis gas comprises hydrogen gas and a carbon-containing gas selected from the group consisting of carbon monoxide, carbon dioxide, and mixtures thereof. A hybrid catalyst generally comprises a combination of a metal oxide component and a microporous catalyst component that operate in tandem.

Technical Background

For a number of industrial applications, paraffins are used, or are starting materials used, to produce plastics, fuels, and various downstream chemicals. Such paraffins include $C_2$ to $C_5$ materials, such as ethane, propane, butane, and pentane. A variety of processes for producing these lower paraffins have been developed, including petroleum cracking and various synthetic processes.

Synthetic processes for converting feed carbon to desired products, such as paraffins, are known. Some of these synthetic processes begin with use of a hybrid catalyst. Different types of catalysts have also been explored, as well as different kinds of feed streams and proportions of feed stream components. However, many of these synthetic processes have low carbon conversion and much of the feed carbon either (1) does not get converted and exits the process in the same form as the feed carbon; (2) is converted to $CO_2$; or (3) these synthetic processes have low stability over time and the catalyst rapidly loses its activity for carbon conversion and/or its selectivity to desirable products. For example, many synthetic processes tend to have increased methane production—and, thus, decreased $C_2$ to $C_5$ paraffin production-over time.

Accordingly, a need exists for hybrid catalysts and methods that have a high conversion of feed carbon to desired products, such as, for example, $C_2$ to $C_5$ paraffins in combination with a high stability of the catalyst.

SUMMARY

According to one embodiment, a method for preparing $C_2$ to $C_5$ paraffins comprises: introducing a feed stream comprising hydrogen gas and a carbon-containing gas selected from the group consisting of carbon monoxide, carbon dioxide, and mixtures thereof into a reaction zone of a reactor; and converting the feed stream into a product stream comprising $C_2$ to $C_5$ paraffins in the reaction zone in the presence of a hybrid catalyst, the hybrid catalyst comprising: a microporous catalyst component; and a metal oxide catalyst component selected from the group consisting of: (A) a bulk material consisting of gallium oxide, (B) gallium oxide present on a titanium dioxide support material, and (C) a mixture of gallium oxide and at least one promoter present on a support material, the support material comprising at least one oxide of a metal selected from Group 4 of the IUPAC periodic table of elements.

According to embodiments, a method for preparing $C_2$ to $C_5$ paraffins comprises: introducing a feed stream comprising hydrogen gas and a carbon-containing gas selected from the group consisting of carbon monoxide, carbon dioxide, and mixtures thereof into a reaction zone of a reactor; and converting the feed stream into a product stream comprising $C_2$ to $C_5$ paraffins in the reaction zone in the presence of a hybrid catalyst, the hybrid catalyst comprising: a microporous catalyst component; and a metal oxide catalyst, wherein the metal oxide catalyst component is a bulk material consisting of gallium oxide.

According to embodiments, a method for preparing $C_2$ to $C_5$ paraffins comprises: introducing a feed stream comprising hydrogen gas and a carbon-containing gas selected from the group consisting of carbon monoxide, carbon dioxide, and mixtures thereof into a reaction zone of a reactor; and converting the feed stream into a product stream comprising $C_2$ to $C_5$ paraffins in the reaction zone in the presence of a hybrid catalyst, the hybrid catalyst comprising: a microporous catalyst component; and a metal oxide catalyst component, wherein the metal oxide catalyst component is gallium oxide present on a titanium dioxide support material.

According to embodiments, a method for preparing $C_2$ to $C_5$ paraffins comprises: introducing a feed stream comprising hydrogen gas and a carbon-containing gas selected from the group consisting of carbon monoxide, carbon dioxide, and mixtures thereof into a reaction zone of a reactor; and converting the feed stream into a product stream comprising $C_2$ to $C_5$ paraffins in the reaction zone in the presence of a hybrid catalyst, the hybrid catalyst comprising: a microporous catalyst component; and a metal oxide catalyst component, wherein the metal oxide catalyst component is a mixture of gallium oxide and at least one promoter present on a support material, the support material comprising at least one oxide of a metal selected from Group 4 of the IUPAC periodic table of elements.

Additional features and advantages will be set forth in the detailed description which follows, and in part will be readily apparent to those skilled in the art from that description or recognized by practicing the embodiments described herein, including the detailed description which follows and the claims.

It is to be understood that both the foregoing general description and the following detailed description describe various embodiments and are intended to provide an overview or framework for understanding the nature and character of the claimed subject matter.

DETAILED DESCRIPTION

Reference will now be made in detail to embodiments of hybrid catalysts and methods using the hybrid catalyst to prepare $C_2$ to $C_5$ paraffins. In one embodiment, a method for preparing $C_2$ to $C_5$ paraffins comprises: introducing a feed stream comprising hydrogen gas and a carbon-containing gas selected from the group consisting of carbon monoxide, carbon dioxide, and mixtures thereof into a reaction zone of a reactor; and converting the feed stream into a product stream comprising $C_2$ to $C_5$ paraffins in the reaction zone in the presence of a hybrid catalyst, the hybrid catalyst comprising: a microporous catalyst component; and a metal oxide catalyst component selected from the group consisting of: (A) a bulk material consisting of gallium oxide, (B) gallium oxide present on a titanium dioxide support material, and (C) a mixture of gallium oxide and at least one promoter present on a support material, the support material comprising at least one oxide of a metal selected from Group 4 of the IUPAC periodic table of elements.

The use of hybrid catalysts to convert feed streams comprising carbon to desired products, such as, for example, $C_2$ to $C_5$ paraffins, is known. However, many known hybrid catalysts are inefficient, because they exhibit a low feed carbon conversion and/or deactivate quickly as they are used, such as, for example, by having an increase in methane production, which leads to a lower paraffin yield and low stability for a given set of operating conditions over a given amount of time. In contrast, hybrid catalysts disclosed and described herein exhibit an improved yield of $C_2$ to $C_5$ paraffins, even as the catalyst time on stream increases. The composition of such hybrid catalysts used in embodiments is discussed below.

As a summary, hybrid catalysts closely couple sequential reactions on each of the two independent catalysts. In the first step, a feed stream comprising hydrogen gas ($H_2$) and at least one of carbon monoxide (CO), carbon dioxide ($CO_2$), or a mixture of CO and $CO_2$, such as, for example, syngas, is converted into oxygenated hydrocarbons. In the second step, these oxygenates are converted into hydrocarbons (mostly short chain hydrocarbons, such as, for example $C_2$ to $C_5$ paraffins). The continued withdrawal of oxygenates formed in the first step by the reactions of the second step ensures that there is no thermodynamic limit to achieve close to 100% (>99.9%) feed carbon conversion to hydrocarbons.

Hybrid catalyst systems comprise a metal oxide catalyst component, which converts the feed stream to oxygenated hydrocarbons, and a microporous catalyst component (such as, for example, a zeolite component), which converts the oxygenates to hydrocarbons. Known hybrid catalyst systems are based on chromium-zinc metal oxide or copper-zinc-aluminum metal oxide catalysts and generally exhibit a trade-off between initial yield of $C_2$ to $C_5$ paraffins and sustained yield of $C_2$ to $C_5$ paraffins as the catalyst time on stream increases (also referred to as stability). There is accordingly a need for a metal oxide catalyst component that results in a high initial yield as well as a high stability when combined with a microporous catalyst component in a hybrid catalyst process. It should be understood that, as used herein, the "metal oxide catalyst component" includes metals in various oxidation states. In some embodiments, the metal oxide catalyst component may comprise more than one metal oxide and individual metal oxides within the metal oxide catalyst component may have different oxidation states. Thus, the metal oxide catalyst component is not limited to comprising metal oxides with homogeneous oxidation states.

Embodiments of hybrid catalysts disclosed herein comprise a metal oxide catalyst component that comprises gallium. In embodiments, the metal oxide component is selected from the group consisting of: (A) a bulk material consisting of gallium oxide, (B) gallium oxide present on a titanium dioxide support material, and (C) a mixture of gallium oxide and at least one promoter present on a support material, the support material comprising at least one oxide of a metal selected from Group 4 of the IUPAC periodic table of elements.

The metal oxide catalyst component is combined with a microporous catalyst component. The microporous catalyst component is, according to some embodiments, an 8-MR microporous catalyst component, such as, for example, SAPO-34 molecular sieve.

Metal oxide catalyst components for use in a hybrid catalyst according to embodiments will now be described. As referred to above, metals commonly used as constituents of the metal oxide catalyst component of some hybrid catalysts include combinations of zinc (Zn) and chromium (Cr) or combinations of copper (Cu), zinc (Zn) and aluminum (Al). However, conventional hybrid catalysts comprising, for example, zinc and chromium, which are conventionally known as high temperature methanol synthesis catalysts, do not generally have a combination of good activity and selectivity to $C_2$-$C_5$ paraffins (good initial yield) and good stability when kept on stream for an extended period of time. Methane selectivity increases gradually over time. Other conventional catalysts comprising copper, zinc and aluminum, which are known as conventional low-temperature methanol synthesis catalysts, demonstrate high initial activity and initial selectivity for $C_2$ to $C_5$ hydrocarbons. However, the stability of these catalysts decreases over extended periods of time, which is accompanied by enhanced methane formation and a decrease in $C_2$ to $C_5$ hydrocarbon selectivity. Although other metal combination have been used, zinc-chromium or copper-zinc-aluminum metal oxide components have long been thought to be the most efficient metal oxide components in a hybrid catalyst for producing lower paraffins, such as $C_2$ to $C_5$ paraffins. However, it has been found that gallium-containing mixed oxides (bulk and supported) in a combination with microporous catalyst components are capable of converting carbon in carbon-containing gases (such as, for example, syngas) to short-chain paraffins in high yields. In composite formulation with SAPO-34, gallium oxide-containing metal oxide components can exhibit a surprising catalytic activity while generating little methane and maintaining low $CH_4$ selectivity, also over time. According to some embodiments, gallium oxide deposited onto a titanium dioxide ($TiO_2$) support may be further advantaged in terms of increasing conversion levels while maintaining intrinsic preference for $C_2$-$C_5$ paraffins. According to embodiments, gallium oxide and a promoter (such as, for example, group 10 metals on the International Union of Pure and Applied Chemistry (IUPAC) periodic table) deposited onto a support material (such as, for example, group 4 oxides on the IUPAC periodic table) may be further advantaged in terms of increasing conversion levels while maintaining intrinsic preference for $C_2$-$C_5$ paraffins. On the other hand, it was found that silica-based carriers bring about little advantage eventually leading to poorly-performing gallium catalysts under certain conditions. For instance, Ni—Ga/$SiO_2$ based catalysts have low activity if CO is present in the feed.

As disclosed herein above, the gallium-containing portion of the metal oxide catalyst component may be present, according to embodiments, in one of three forms: (1) as a bulk material consisting of gallium oxide; (2) as gallium present on a $TiO_2$ support material (also referred to herein as "supported gallium"); or (3) as a mixture of gallium oxide and a promoter present on a support material comprising at least one oxide of a metal selected from Group 4 of the IUPAC periodic table of elements (also referred to herein as "supported and promoted gallium"). Each of these will be discussed in more detail below.

Bulk Gallium

According to embodiments, the metal oxide catalyst component is bulk gallium oxide. In such embodiments, the metal oxide catalyst component consists essentially of or consists of gallium oxide—meaning that the metal oxide catalyst component comprises only α-, β-, γ-, δ-, ε-gallium oxide, or a combination thereof, and, at most, trace amounts of impurities. In embodiments where the metal oxide catalyst component is bulk gallium oxide, the gallium oxide may be directly added to the microporous catalyst component. For example, bulk gallium oxide and the microporous catalyst component may be added together in a vessel and agitated (such as, for example, by shaking the vessel) until the gallium oxide and the microporous catalyst component are well mixed.

The metal oxide catalyst component may, in embodiments, comprise from 1.0 wt % to 99.0 wt % of the hybrid catalyst, such as from 5.0 wt % to 99.0 wt %, from 10.0 wt % to 99.0 wt %, from 15.0 wt % to 99.0 wt %, from 20.0 wt % to 99.0 wt %, from 25.0 wt % to 99.0 wt %, from 30.0 wt % to 99.0 wt %, from 35.0 wt % to 99.0 wt %, from 40.0 wt % to 99.0 wt %, from 45.0 wt % to 99.0 wt %, from 50.0 wt % to 99.0 wt %, from 55.0 wt % to 99.0 wt %, from 60.0 wt % to 99.0 wt %, from 65.0 wt % to 99.0 wt %, from 70.0 wt % to 99.0 wt %, from 75.0 wt % to 99.0 wt %, from 80.0 wt % to 99.0 wt %, from 85.0 wt % to 99.0 wt %, from 90.0 wt % to 99.0 wt %, or from 95.0 wt % to 99.0 wt %. In some embodiments, the metal oxide catalyst component comprises from 1.0 wt % to 95.0 wt % of the hybrid catalyst, such as from 1.0 wt % to 90.0 wt %, from 1.0 wt % to 85.0 wt %, from 1.0 wt % to 80.0 wt %, from 1.0 wt % to 75.0 wt %, from 1.0 wt % to 70.0 wt %, from 1.0 wt % to 65.0 wt %, from 1.0 wt % to 60.0 wt %, from 1.0 wt % to 55.0 wt %, from 1.0 wt % to 50.0 wt %, from 1.0 wt % to 45.0 wt %, from 1.0 wt % to 40.0 wt %, from 1.0 wt % to 35.0 wt %, from 1.0 wt % to 30.0 wt %, from 1.0 wt % to 25.0 wt %, from 1.0 wt % to 20.0 wt %, from 1.0 wt % to 15.0 wt %, from 1.0 wt % to 10.0 wt %, or from 1.0 wt % to 5.0 wt %. In some embodiments, the metal oxide catalyst component comprises from 5.0 wt % to 95.0 wt % of the hybrid catalyst, such as from 10.0 wt % to 90.0 wt %, from 15.0 wt % to 85.0 wt %, from 20.0 wt % to 80.0 wt %, from 25.0 wt % to 75.0 wt %, from 30.0 wt % to 70.0 wt %, from 35.0 wt % to 65.0 wt %, from 40.0 wt % to 60.0 wt %, or from 45.0 wt % to 55.0 wt %.

Supported Gallium

In some embodiments, the metal oxide catalyst component is supported gallium. In such embodiments, gallium is added to a support structure to form the metal oxide catalyst component. Subsequently, the metal oxide catalyst component is added to the microporous catalyst component. According to embodiments, the support comprises, consists essentially of, or consists of $TiO_2$. It should be understood that the $TiO_2$ supports used herein may be any polymorph of $TiO_2$. In some embodiments, the support may be, for example, anatase $TiO_2$, rutile $TiO_2$, brookite $TiO_2$, and mixtures thereof. According to some embodiments, the $TiO_2$ support may have a BET surface area that is greater than or equal to 40 meters squared per gram ($m^2/g$), such as greater than 50 $m^2/g$, greater than 60 $m^2/g$, greater than 70 $m^2/g$, greater than 80 $m^2/g$, greater than 90 $m^2/g$, greater than 100 $m^2/g$, greater than 110 $m^2/g$, greater than 120 $m^2/g$, greater than 130 $m^2/g$, greater than 140 $m^2/g$, greater than 150 $m^2/g$, greater than 160 $m^2/g$, greater than 170 $m^2/g$, greater than 180 $m^2/g$, or greater than 190 $m^2/g$. According to some embodiments, the maximum BET surface area of the $TiO_2$ support is 200 $m^2/g$. It should be understood that this maximum BET surface area may be applied as a maximum to any of the above ranges according to embodiments disclosed herein. Accordingly, in some embodiments, the BET surface area of the $TiO_2$ support is from 40 $m^2/g$ to 200 $m^2/g$, such as from 50 $m^2/g$ to 200 $m^2/g$, from 60 $m^2/g$ to 200 $m^2/g$, from 70 $m^2/g$ to 200 $m^2/g$, from 80 $m^2/g$ to 200 $m^2/g$, from 90 $m^2/g$ to 200 $m^2/g$, from 100 $m^2/g$ to 200 $m^2/g$, from 110 $m^2/g$ to 200 $m^2/g$, from 120 $m^2/g$ to 200 $m^2/g$, from 130 $m^2/g$ to 200 $m^2/g$, from 140 $m^2/g$ to 200 $m^2/g$, from 150 $m^2/g$ to 200 $m^2/g$, from 170 $m^2/g$ to 200 $m^2/g$, from 180 $m^2/g$ to 200 $m^2/g$, or from 190 $m^2/g$ to 200 $m^2/g$. In some embodiments, the BET surface area of the $TiO_2$ support is from 80 $m^2/g$ to 180 $m^2/g$, such as from 90 $m^2/g$ to 170 $m^2/g$, from 100 $m^2/g$ to 160 $m^2/g$, from 110 $m^2/g$ to 150 $m^2/g$, from 120 $m^2/g$ to 140 $m^2/g$, or about 130 $m^2/g$.

The gallium may be added to the support by any suitable method. However, in some embodiments, the gallium is added to the support by an incipient wetness impregnation method. In such a method, an aqueous mixture of a gallium precursor material, which, in embodiments, may be gallium nitrate ($Ga(NO_3)_3$) is added to the support particles in a dosed amount (such as dropwise) while vigorously shaking the support particles. It should be understood that the total amount of gallium precursor that is mixed with the support particles will be determined on the desired target amount of gallium in metal oxide catalyst component. Once the gallium precursor and support particles are adequately mixed, the resulting metal oxide catalyst component may be dried at temperatures less than 200 degrees Celsius (° C.), such as less than 175° C., or less than 150° C. According to some embodiments, and subsequent to the drying, the metal oxide catalyst component may be calcined at temperatures from 400° C. to 800° C., such as from 425° C. to 775° C., from 450° C. to 750° C., from 475° C. to 725° C., from 500° C. to 700° C., from 525° C. to 675° C., from 550° C. to 650° C., from 575° C. to 625° C., or about 600° C.

A weight percent of gallium may be measured based upon the total weight of the metal oxide catalyst component. For example, where the metal oxide catalyst component comprises gallium supported on a $TiO_2$ support, the weight percent of gallium is expressed as a percentage of gallium to the total amount of gallium and titanium oxides in the metal oxide catalyst component. Accordingly, in some embodiments, the weight percent of gallium in the metal oxide catalyst component may be from 0.1 wt % to 10.0 wt %, such as from 0.5 wt % to 10.0 wt %, from 1.0 wt % to 10.0 wt %, from 1.5 wt % to 10.0 wt %, from 2.0 wt % to 10.0 wt %, from 2.5 wt % to 10.0 wt %, from 3.0 wt % to 10.0 wt %, from 3.5 wt % to 10.0 wt %, from 4.0 wt % to 10.0 wt %, from 4.5 wt % to 10.0 wt %, from 5.0 wt % to 10.0 wt %, from 5.5 wt % to 10.0 wt %, from 6.0 wt % to 10.0 wt %, from 6.5 wt % to 10.0 wt %, from 7.0 wt % to 10.0 wt %, from 7.5 wt % to 10.0 wt %, from 8.0 wt % to 10.0 wt %, from 8.5 wt % to 10.0 wt %, from 9.0 wt % to 10.0 wt %, or from 9.5 wt % to 10.0 wt %. In some embodiments, the weight percent of gallium in the metal oxide catalyst component is from 0.1 wt % to 9.5 wt %, such as from 0.1 wt % to 9.0 wt %, from 0.1 wt % to 8.5 wt %, from 0.1 wt % to 8.0 wt %, from 0.1 wt % to 7.5 wt %, from 0.1 wt % to 7.0 wt %, from 0.1 wt % to 6.5 wt %, from 0.1 wt % to 6.0 wt %, from 0.1 wt % to 5.5 wt %, from 0.1 wt % to 5.0 wt %, from 0.1 wt % to 4.5 wt %, from 0.1 wt % to 4.0 wt %, from 0.1 wt % to 3.5 wt %, from 0.1 wt % to 3.0 wt %, from 0.1 wt % to 2.5 wt %, from 0.1 wt % to 2.0 wt %, from 0.1 wt % to 1.5 wt %, from 0.1 wt % to 1.0 wt %, or from 0.1 wt % to 0.5 wt %. In some embodiments, the weight of gallium in the metal oxide catalyst component is from 0.5 wt % to 9.5 wt %, such as from 1.0 wt % to 9.0 wt %, from 1.5 wt % to 8.5 wt %, from 2.0 wt % to 8.0 wt %, from 2.5 wt % to 7.5 wt %, from 3.0 wt % to 7.0 wt %, from 3.5 wt % to 6.5 wt %, from 4.0 wt % to 6.0 wt %, or from 4.5 wt % to 5.5 wt %.

The non-calcined or calcined metal oxide catalyst component may be added to the microporous catalyst component. For example, the metal oxide catalyst component and the microporous catalyst component may be added together in a vessel and agitated (such as, for example, by shaking the vessel) until the metal oxide catalyst component and the microporous catalyst component are well mixed.

The metal oxide catalyst component may, in embodiments, comprise from 1.0 wt % to 99.0 wt % of the hybrid catalyst, such as from 5.0 wt % to 99.0 wt %, from 10.0 wt % to 99.0 wt %, from 15.0 wt % to 99.0 wt %, from 20.0 wt % to 99.0 wt %, from 25.0 wt % to 99.0 wt %, from 30.0 wt % to 99.0 wt %, from 35.0 wt % to 99.0 wt %, from 40.0 wt % to 99.0 wt %, from 45.0 wt % to 99.0 wt %, from 50.0 wt % to 99.0 wt %, from 55.0 wt % to 99.0 wt %, from 60.0 wt % to 99.0 wt %, from 65.0 wt % to 99.0 wt %, from 70.0 wt % to 99.0 wt %, from 75.0 wt % to 99.0 wt %, from 80.0 wt % to 99.0 wt %, from 85.0 wt % to 99.0 wt %, from 90.0 wt % to 99.0 wt %, or from 95.0 wt % to 99.0 wt %. In some embodiments, the metal oxide catalyst component comprises from 1.0 wt % to 95.0 wt % of the hybrid catalyst, such as from 1.0 wt % to 90.0 wt %, from 1.0 wt % to 85.0 wt %, from 1.0 wt % to 80.0 wt %, from 1.0 wt % to 75.0 wt %, from 1.0 wt % to 70.0 wt %, from 1.0 wt % to 65.0 wt %, from 1.0 wt % to 60.0 wt %, from 1.0 wt % to 55.0 wt %, from 1.0 wt % to 50.0 wt %, from 1.0 wt % to 45.0 wt %, from 1.0 wt % to 40.0 wt %, from 1.0 wt % to 35.0 wt %, from 1.0 wt % to 30.0 wt %, from 1.0 wt % to 25.0 wt %, from 1.0 wt % to 20.0 wt %, from 1.0 wt % to 15.0 wt %, from 1.0 wt % to 10.0 wt %, or from 1.0 wt % to 5.0 wt %. In some embodiments, the metal oxide catalyst component comprises from 5.0 wt % to 95.0 wt % of the hybrid catalyst, such as from 10.0 wt % to 90.0 wt %, from 15.0 wt % to 85.0 wt %, from 20.0 wt % to 80.0 wt %, from 25.0 wt % to 75.0 wt %, from 30.0 wt % to 70.0 wt %, from 35.0 wt % to 65.0 wt %, from 40.0 wt % to 60.0 wt %, or from 45.0 wt % to 55.0 wt %.

Supported and Promoted Gallium

In some embodiments, the metal oxide catalyst component is supported and promoted gallium. In such embodiments, gallium and a promoter are added to a support structure to form the metal oxide catalyst component. Subsequently, the metal oxide catalyst component is added to the microporous catalyst component. In embodiments, the promoter comprises an element selected from group 10 of the IUPAC periodic table of elements. In some embodiments, the promoter comprises an element selected from the group consisting of palladium (Pd), nickel (Ni), platinum (Pt), and mixtures thereof. In embodiments, the support may comprise an oxide selected from oxides of group 4 elements in the IUPAC periodic table of elements. For example, in some embodiments, the support may be selected from the group consisting of one or more oxides of titanium (Ti), zirconium (Zr), hafnium (Hf, and mixtures thereof. In one or more embodiments, the support may be selected from the group consisting of $TiO_2$, $ZrO_2$, $HfO_2$, and mixtures thereof. The support, according to embodiments is $ZrO_2$.

According to some embodiments, the support may have a BET surface area that is greater than or equal to 40 m$^2$/g, such as greater than 50 m$^2$/g, greater than 60 m$^2$/g, greater than 70 m$^2$/g, greater than 80 m$^2$/g, greater than 90 m$^2$/g, greater than 100 m$^2$/g, greater than 110 m$^2$/g, greater than 120 m$^2$/g, greater than 130 m$^2$/g, greater than 140 m$^2$/g, greater than 150 m$^2$/g, greater than 160 m$^2$/g, greater than 170 m$^2$/g, greater than 180 m$^2$/g, greater than 190 m$^2$/g, greater than 200 m$^2$/g, greater than 210 m$^2$/g, greater than 220 m$^2$/g, greater than 230 m$^2$/g, greater than 240 m$^2$/g, greater than 250 m$^2$/g, greater than 260 m$^2$/g, greater than 270 m$^2$/g, greater than 280 m$^2$/g, or greater than 290 m$^2$/g. According to some embodiments, the maximum BET surface area of the support is 300 m$^2$/g. It should be understood that this maximum BET surface area may be applied as a maximum to any of the above ranges according to embodiments disclosed herein. Accordingly, in some embodiments, the BET surface area of the support is from 40 m$^2$/g to 300 m$^2$/g, such as from 50 m$^2$/g to 200 m$^2$/g, from 60 m$^2$/g to 150 m$^2$/g, from 70 m$^2$/g to 130 m$^2$/g, from 80 m$^2$/g to 130 m$^2$/g, or from 90 m$^2$/g to 130 m$^2$/g.

The gallium and promoter may be added to the support by any suitable method. However, in some embodiments, the gallium and promoter are added to the support by an incipient wetness co-impregnation method. In such a method, an aqueous mixture of a gallium precursor material—which, in embodiments, may be gallium nitrate (Ga(NO$_3$)$_3$)—and an aqueous mixture of a promoter precursor material—which in embodiments may be a nitrate of the promoter metal (such as a group 10 metal in the IUPAC periodic table of elements)—are added to the support particles in a dosed amount (such as dropwise) while vigorously shaking the support particles. In some embodiments, the aqueous mixture of gallium precursor and the aqueous mixture of promoter precursor are combined before being added to the support particles. In some embodiments, the aqueous mixture of gallium precursor and the aqueous mixture of promoter materials are not combined before being added to the support particles. It should be understood that the total amount of gallium precursor and promoter precursor that is mixed with the support particles will be determined on the desired target amount of gallium in metal oxide catalyst component. Once the gallium precursor and support particles are adequately mixed, the resulting metal oxide catalyst component may be dried at temperatures less than 200 degrees Celsius (° C.), such as less than 175° C., or less than 150° C. According to some embodiments, and subsequent to the drying, the metal oxide catalyst component may be calcined at temperatures from 400° C. to 800° C., such as from 425° C. to 775° C., from 450° C. to 750° C., from 475° C. to 725° C., from 500° C. to 700° C., from 525° C. to 675° C., from 550° C. to 650° C., from 575° C. to 625° C., or about 600° C.

A weight percent of promoter in the metal oxide catalyst component may be measured based upon the total weight of the metal oxide catalyst component. Accordingly, in some embodiments, the weight percent of the promoter in the metal oxide catalyst component may be from 0.01 wt % to 10.00 wt %, such as from 0.50 wt % to 10.00 wt %, from 1.00 wt % to 10.00 wt %, from 1.50 wt % to 10.00 wt %, from 2.00 wt % to 10.00 wt %, from 2.50 wt % to 10.00 wt %, from 3.00 wt % to 10.00 wt %, from 3.50 wt % to 10.00 wt %, from 4.00 wt % to 10.00 wt %, from 4.50 wt % to 10.00 wt %, from 5.00 wt % to 10.00 wt %, from 5.50 wt % to 10.00 wt %, from 6.00 wt % to 10.00 wt %, from 6.50 wt % to 10.00 wt %, from 7.00 wt % to 10.00 wt %, from 7.50 wt % to 10.00 wt %, from 8.00 wt % to 10.00 wt %, from 8.50 wt % to 10.00 wt %, from 9.00 wt % to 10.00 wt %, or from 9.50 wt % to 10.00 wt %. In some embodiments, the weight percent of the promoter in the metal oxide catalyst component is from 0.01 wt % to 9.50 wt %, such as from 0.01 wt % to 9.00 wt %, from 0.01 wt % to 8.50 wt %, from 0.01 wt % to 8.00 wt %, from 0.01 wt % to 7.50 wt %, from 0.01 wt % to 7.00 wt %, from 0.01 wt % to 6.50 wt %, from 0.01 wt % to 6.00 wt %, from 0.01 wt % to 5.50 wt %, from 0.01 wt % to 5.00 wt %, from 0.01 wt % to 4.50 wt %, from 0.01 wt % to 4.00 wt %, from 0.01 wt % to 3.50 wt %, from 0.01 wt % to 3.00 wt %, from 0.01 wt % to 2.50 wt %, from 0.01 wt % to 2.00 wt %, from 0.01 wt % to 1.50 wt %, from 0.01 wt % to 1.00 wt %, or from 0.01 wt % to 0.50 wt %. In some embodiments, the weight percent of the promoter in the metal oxide catalyst component is from 0.50 wt % to 9.50 wt %, such as from 1.00 wt % to 9.00 wt %, from 1.50 wt % to 8.50 wt %, from 2.00 wt % to 8.00 wt %, from 2.50 wt % to 7.50 wt %, from 3.00 wt % to 7.00 wt %, from 3.50 wt % to 6.50 wt %, from 4.00 wt % to 6.00 wt %, or from 4.50 wt % to 5.50 wt %.

A weight percent of gallium may be measured based upon the total weight the metal oxide catalyst component. Accordingly, in some embodiments, the weight percent of gallium in the metal oxide catalyst component may be from 0.1 wt % to 10.0 wt %, such as from 0.5 wt % to 10.0 wt %, from 1.0 wt % to 10.0 wt %, from 1.5 wt % to 10.0 wt %, from 2.0 wt % to 10.0 wt %, from 2.5 wt % to 10.0 wt %, from 3.0 wt % to 10.0 wt %, from 3.5 wt % to 10.0 wt %, from 4.0 wt % to 10.0 wt %, from 4.5 wt % to 10.0 wt %, from 5.0 wt % to 10.0 wt %, from 5.5 wt % to 10.0 wt %, from 6.0 wt % to 10.0 wt %, from 6.5 wt % to 10.0 wt %, from 7.0 wt % to 10.0 wt %, from 7.5 wt % to 10.0 wt %, from 8.0 wt % to 10.0 wt %, from 8.5 wt % to 10.0 wt %, from 9.0 wt % to 10.0 wt %, or from 9.5 wt % to 10.0 wt %. In some embodiments, the weight percent of gallium in the metal oxide catalyst component is from 0.1 wt % to 9.5 wt %, such as from 0.1 wt % to 9.0 wt %, from 0.1 wt % to 8.5 wt %, from 0.1 wt % to 8.0 wt %, from 0.1 wt % to 7.5 wt %, from 0.1 wt % to 7.0 wt %, from 0.1 wt % to 6.5 wt %, from 0.1 wt % to 6.0 wt %, from 0.1 wt % to 5.5 wt %, from 0.1 wt % to 5.0 wt %, from 0.1 wt % to 4.5 wt %, from 0.1 wt % to 4.0 wt %, from 0.1 wt % to 3.5 wt %, from 0.1 wt % to 3.0 wt %, from 0.1 wt % to 2.5 wt %, from 0.1 wt % to 2.0 wt %, from 0.1 wt % to 1.5 wt %, from 0.1 wt % to 1.0 wt %, or from 0.1 wt % to 0.5 wt %. In some embodiments, the weight of gallium in the metal oxide catalyst component is from 0.5 wt % to 9.5 wt %, such as from 1.0 wt % to 9.0 wt %, from 1.5 wt % to 8.5 wt %, from 2.0 wt % to 8.0 wt %, from 2.5 wt % to 7.5 wt %, from 3.0 wt % to 7.0 wt %, from 3.5 wt % to 6.5 wt %, from 4.0 wt % to 6.0 wt %, or from 4.5 wt % to 5.5 wt %.

The non-calcined or calcined metal oxide catalyst component may be added to the microporous catalyst component. For example, the metal oxide catalyst component and the microporous catalyst component may be added together in a vessel and agitated (such as, for example, by shaking the vessel) until the metal oxide catalyst component and the microporous catalyst component are well mixed.

The metal oxide catalyst component may, in embodiments, comprise from 1.0 wt % to 99.0 wt % of the hybrid catalyst, such as from 5.0 wt % to 99.0 wt %, from 10.0 wt % to 99.0 wt %, from 15.0 wt % to 99.0 wt %, from 20.0 wt % to 99.0 wt %, from 25.0 wt % to 99.0 wt %, from 30.0 wt % to 99.0 wt %, from 35.0 wt % to 99.0 wt %, from 40.0 wt % to 99.0 wt %, from 45.0 wt % to 99.0 wt %, from 50.0 wt % to 99.0 wt %, from 55.0 wt % to 99.0 wt %, from 60.0 wt % to 99.0 wt %, from 65.0 wt % to 99.0 wt %, from 70.0 wt % to 99.0 wt %, from 75.0 wt % to 99.0 wt %, from 80.0 wt % to 99.0 wt %, from 85.0 wt % to 99.0 wt %, from 90.0 wt % to 99.0 wt %, or from 95.0 wt % to 99.0 wt %. In some embodiments, the metal oxide catalyst component comprises from 1.0 wt % to 95.0 wt % of the hybrid catalyst, such as from 1.0 wt % to 90.0 wt %, from 1.0 wt % to 85.0 wt %, from 1.0 wt % to 80.0 wt %, from 1.0 wt % to 75.0 wt %, from 1.0 wt % to 70.0 wt %, from 1.0 wt % to 65.0 wt %, from 1.0 wt % to 60.0 wt %, from 1.0 wt % to 55.0 wt %, from 1.0 wt % to 50.0 wt %, from 1.0 wt % to 45.0 wt %, from 1.0 wt % to 40.0 wt %, from 1.0 wt % to 35.0 wt %, from 1.0 wt % to 30.0 wt %, from 1.0 wt % to 25.0 wt %, from 1.0 wt % to 20.0 wt %, from 1.0 wt % to 15.0 wt %, from 1.0 wt % to 10.0 wt %, or from 1.0 wt % to 5.0 wt %. In some embodiments, the metal oxide catalyst component comprises from 5.0 wt % to 95.0 wt % of the hybrid catalyst, such as from 10.0 wt % to 90.0 wt %, from 15.0 wt % to 85.0 wt %, from 20.0 wt % to 80.0 wt %, from 25.0 wt % to 75.0 wt %, from 30.0 wt % to 70.0 wt %, from 35.0 wt % to 65.0 wt %, from 40.0 wt % to 60.0 wt %, or from 45.0 wt % to 55.0 wt %.

Microporous Catalyst Component

In any of the above embodiments, after the metal oxide catalyst component has been formed—such as, for example, by the methods disclosed above—the metal oxide catalyst component is physically mixed with a microporous catalyst component, as disclosed above. The microporous catalyst component is, in embodiments, selected from molecular sieves having 8-MR pore openings and having a framework type selected from the group consisting of the following framework types CHA, AEI, AFX, ERI, LTA, UFI, RTH, and combinations thereof, the framework types corresponding to the naming convention of the International Zeolite Association. It should be understood that in embodiments, both aluminosilicate and silicoaluminophosphate frameworks may be used. In certain embodiments, the microporous catalyst component may be silicoaluminophosphate having a Chabazite (CHA) framework type. Examples of these may include, but are not necessarily limited to: CHA embodiments selected from SAPO-34 and SSZ-13; and AEI embodiments such as SAPO-18 or SSZ-39. Combinations of microporous catalyst components having any of the above framework types may also be employed. It should be understood that the microporous catalyst component may have different membered ring pore opening depending on the desired product. For instance, microporous catalyst component having 8-MR to 12-MR pore openings could be used depending on the desired product. However, to produce $C_2$ to $C_5$ paraffins, a microporous catalyst component having 8-MR pore openings is used in embodiments. The metal oxide catalyst component may be added to the microporous catalyst component in the amounts disclosed above for each of the three types of metal oxide catalyst components (e.g., bulk gallium, supported gallium, and supported and promoted gallium).

Processes for Forming $C_2$ to $C_5$ Paraffins Using the Hybrid Catalyst

After the metal oxide catalyst component has been formed and combined with a microporous catalyst component to form a hybrid catalyst, the hybrid catalyst may be used in methods for converting carbon in a carbon-containing feed stream to $C_2$ to $C_5$ paraffins. Such processes will be described in more detail below.

According to embodiments, a feed stream is fed into a reaction zone, the feed stream comprising hydrogen ($H_2$) gas and a carbon-containing gas selected from carbon monoxide (CO), carbon dioxide ($CO_2$), and combinations thereof. In some embodiments, the $H_2$ gas is present in the feed stream in an amount of from 10 volume percent (vol %) to 90 vol %, based on combined volumes of the $H_2$ gas and the gas selected from CO, $CO_2$, and combinations thereof. The feed stream is contacted with a hybrid catalyst comprising: a microporous catalyst component; and a metal oxide catalyst component selected from the group consisting of: (A) a bulk material consisting of gallium oxide, (B) gallium oxide present on a titanium dioxide support material, and (C) a mixture of gallium oxide and at least one promoter present on a support material, the support material comprising at least one oxide of a metal selected from Group 4 of the IUPAC periodic table of elements.

The feed stream is contacted with the hybrid catalyst in the reaction zone under reaction conditions sufficient to form a product stream comprising $C_2$ to $C_5$ paraffins. The reaction conditions comprise a temperature within reaction zone ranging, according to one or more embodiments, from 300° C. to 500° C., such as from 300° C. to 475° C., from 300° C. to 450° C., from 300° C. to 425° C., from 300° C. to 400° C., from 300° C. to 375° C., from 300° C. to 350° C., or from 300° C. to 325° C. In other embodiments, the temperature within the reaction zone is from 325° C. to 500° C., from 350° C. to 500° C., from 375° C. to 500° C., from 400° C. to 500° C., from 425° C. to 500° C., from 450° C. to 500° C., or from 475° C. to 500° C. In yet other embodiments, the temperature within the reaction zone is from 300° C. to 500° C., such as from 325° C. to 475° C., from 350° C. to 450° C., or from 360° C. to 440° C.

The reaction conditions also, in embodiments, include a pressure inside the reaction zone of at least 1 bar (100 kilopascals (kPa)), such as at least 5 bar (500 kPa), at least 10 bar (1,000 kPa), at least 15 bar (1,500 kPa), at least 20 bar (2,000 kPa), at least 25 bar (2,500 kPa), at least 30 bar (3,000 kPa), at least 35 bar (3,500 kPa), at least 40 bar (4,000 kPa), at least 45 bar (4,500 kPa), at least 50 bar (5,000 kPa), at least 55 bar (5,500 kPa), at least 60 bar (6,000 kPa), at least 65 bar (6,500 kPa), at least 70 bar (7,000 kPa), at least 75 bar (7,500 kPa), at least 80 bar (8,000 kPa), at least 85 bar (8,500 kPa), at least 90 bar (9,000 kPa), at least 95 bar (9,500 kPa), or at least 100 bar (10,000 kPa). In other embodiments, the reaction conditions include a pressure inside the reaction zone is from 5 bar (500 kPa) to 95 bar (9,500 kPa), such as from 10 bar (1,000 kPa) to 90 bar (9,000 kPa), from 15 bar (1,500 kPa) to 85 bar (8,500 kPa), from 20 bar (2,000 kPa) to 80 bar (8,000 kPa), from 25 bar (2,500 kPa) to 75 bar (7,500 kPa), from 30 bar (3,000 kPa) to 70 bar (7,000 kPa), from 35 bar (3,500 kPa) to 65 bar (6,500 kPa), from 40 bar (4,000 kPa) to 60 bar (6,000 kPa), or from 45 bar (4,500 kPa) to 55 bar (5,500 kPa). In some embodiments, the pressure inside the reaction zone is from 20 bar (2,000 kPa) to 60 bar (6,000 kPa).

According to embodiments, the gas hour space velocity (GHSV) within the reaction zone is from 500 per hour (/h) to 12,000/h, such as from 1,000/h to 10,000/h, from 1,500/h to 9,500/h, from 2,000/h to 9,000/h, from 2,500/h to 8,500/h, from 3,000/h to 8,000/h, from 3,500/h to 7,500/h, from 4,000/h to 7,000/h, from 4,500/h to 6,500/h, or from 5,000/h to 6,000/h. In some embodiments the GHSV within the reaction zone is from 1,800/h to 3,600/h, such as from 2,000/h to 3,600/h, from 2,200/h to 3,600/h, from 2,400/h to 3,600/h, from 2,600/h to 3,600/h, from 2,800/h to 3,600/h, from 3,000/h to 3,600/h, from 3,200/h to 3,600/h, or from 3,400/h to 3,600/h. In some embodiments the GHSV within the reaction zone is from 1,800/h to 3,400/h, such as from 1,800/h to 3,200/h, from 1,800/h to 3,000/h, from 1,800/h to 2,800/h, from 1,800/h to 2,600/h, from 1,800/h to 2,400/h, from 1,800/h to 2,200/h, or from 1,800/h to 2,000/h. In some embodiments, the GHSV within the reaction is from 2,000/h to 3,400/h, such as from 2,200/h to 3,200/h, from 2,400/h to 3,000/h, or from 2,600/h to 2,800/h.

By using hybrid catalysts disclosed and described herein along with the process conditions disclosed and described herein, improved $C_2$ to $C_5$ paraffin fraction and carbon conversion may be achieved. For example, in embodiments where the $C_2$ to $C_5$ paraffin fraction in hydrocarbons is greater than or equal to 50.0 mol %, such as greater than or equal to 55.0 mol %, greater than or equal to 60.0 mol %, greater than or equal to 65.0 mol %, greater than or equal to 70.0 mol %, greater than or equal to 75.0 mol %, greater than or equal to 80.0 mol %, greater than or equal to 85.0 mol %, greater than or equal to 90.0 mol %, greater than or equal to 95.0 mol %, or equal to 100.0 mol %.

In embodiments, using hybrid catalysts disclosed and described herein along with the process conditions disclosed and described herein, the carbon conversion may be improved. For example, in embodiments the carbon conversion can be greater than or equal to 25.0 mol %, such as greater than or equal to 30.0 mol %, greater than or equal to 35.0 mol %, greater than or equal to 40.0 mol %, greater than or equal to 45.0 mol %, greater than or equal to 50.0 mol %, greater than or equal to 55.0 mol %, greater than or equal to 60.0 mol %, greater than or equal to 65.0 mol %, greater than or equal to 70.0 mol %, or greater than or equal to 75.0 mol %. In embodiments, the carbon conversion may be from greater than or equal to 25.0 mol % to 100.0 mol %, such as from 30.0 mol % to 100.0 mol %, from 35.0 mol % to 100.0 mol %, from 40.0 mol % to 100.0 mol %, from 45.0 mol % to 100.0 mol %, from 50.0 mol % to 100.0 mol %, from 55.0 mol % to 100.0 mol %, from 60.0 mol % to 100.0 mol %, from 65.0 mol % to 100.0 mol %, from 70.0 mol % to 100.0 mol %, from 75.0 mol % to 100.0 mol %, from 80.0 mol % to 100.0 mol %, from 85.0 mol % to 100.0 mol %, or from 90.0 mol % to 100.0 mol %.

It should be appreciated that in any of the embodiments for producing paraffins disclosed and described herein, $C_2$ to $C_5$ paraffins comprise the majority of the $C_1$ to $C_5$ hydrocarbons in the product mixture. Accordingly, the amount of $C_2$ to $C_5$ paraffins in the product mixture may be measured as a percentage of total $C_1$ to $C_5$ hydrocarbons in the product mixture. In some embodiments, an amount of $C_2$ to $C_5$ paraffins as a carbon mol percent of the total $C_1$ to $C_5$ hydrocarbons in a product mixture is greater than or equal to 50.0 mol %, such as greater than 55.0 mol %, greater than 60.0 mol %, greater than 65.0 mol %, greater than 70.0 mol %, greater than 75.0 mol %, greater than 80.0 wt %, greater than 85.0 mol %, greater than 90.0 mol %, or greater than 95.0 mol %.

EXAMPLES

Embodiments will be further clarified by the following examples.

For each of the following examples and comparative examples, the microporous catalyst component was prepared as follows: SAPO-34 was synthesized per literature procedures (Lok, B. M.; Messina, C. A.; Patton, R. L.; Gajek, R. T.; Cannan, T. R.; Flanigen, E. M. Crystalline silicoaluminophosphates. U.S. Pat. No. 4,440,871A, 1984) and calcined on air using the following program: 25° C. raise to 600° C. at a heating rate of 5° C./min, hold at 600° C. for 4 hours (h), cool down to 25° C. in 4 h. The material was pelletized and sized to 60-80 mesh fraction.

The conditions for testing the efficacy of the catalyst of the examples and comparative example are measured by placing the hybrid catalyst in a reactor zone and contacting the hybrid catalyst with a feed gas having the conditions shown in Table 1 below:

TABLE 1

|  | $H_2$, vol % | CO, vol % | He, vol % | GHSV, $h^{-1}$ | T, °C | P, bar | Time-on-stream [h] |
|---|---|---|---|---|---|---|---|
| Condition 1 | 67.5 | 22.5 | 10 | 1200 | 390 | 30 | 60-80 |
| Condition 2 | 67.5 | 22.5 | 10 | 1200 | 390 | 30 | 100-120 |
| Condition 3 | 67.5 | 22.5 | 10 | 2400 | 420 | 40 | 60-80 |
| Condition 4 | 60.0 | 30.0 | 10 | 1200 | 390 | 30 | 60-80 |
| Condition 5 | 60.0 | 30.0 | 10 | 1200 | 390 | 30 | 50-70 |
| Condition 6 | 67.5 | 22.5 | 10 | 2400 | 420 | 40 | 60-100 |
| Condition 7 | 60.0 | 30.0 | 10 | 1200 | 390 | 20 | 10-20 |
| Condition 8 | 60.0 | 30.0 | 10 | 1200 | 390 | 20 | 40-50 |
| Condition 9 | 60.0 | 30.0 | 10 | 1200 | 390 | 20 | 60-80 |

Example 1

Commercially available bulk $Ga_2O_3$ (available from ALDRICH 20.333-5) was used as the metal oxide catalyst component. The gallium oxide was pelletized, crushed, and sieved to 60-80 mesh size prior to use.

A hybrid catalyst was prepared using the SAPO-34 microporous catalyst component by mixing 200 μL (107.8 mg) of the metal oxide catalyst component (gallium oxide) with 100 μL of SAPO-34 (61.5 mg, 60-80 mesh size) and shaking the mixture for 30 see until well mixed.

The resulting conversion and selectivity achieved is shown in Table 2 below:

TABLE 2

|  | Conv., Cmol % | Selectivity, C mol % | | | | | |
|---|---|---|---|---|---|---|---|
|  |  | $CO_2$ | Oxygenates | $CH_4$ | $C_2H_6$ | Propane | $C_4$ paraffins | $C_5$ paraffins |
| Condition 1 | 27.2 | 47.1 | 0.0 | 6.9 | 5.2 | 26.7 | 9.1 | 0.3 |

|  | Selectivity, C mol % | | | |
|---|---|---|---|---|
|  | Ethylene | Propylene | $C_4$ olefins | $C_5$ olefins |
| Condition 1 | 3.2 | 0.0 | 1.4 | 0.0 |

The productivity and selectivity of $C_2$ to $C_5$ paraffins achieved is shown in Table 3 below:

TABLE 3

|  | Productivity, g/kg_cat/h | | Selectivity, C mol % | | | |
|---|---|---|---|---|---|---|
|  | $C_2$-$C_5$ paraffins | $C_2$-$C_5$ olefins | $C_2$-$C_5$ paraffins | $C_2$-$C_5$ olefins | $CH_4$ | Paraffins fraction, % |
| Condition 1 | 34.4 | 3.6 | 41.3 | 4.6 | 6.9 | 78.2 |

Example 2

A hybrid catalyst was prepared using the SAPO-34 microporous catalyst component and mixing 200 μL of the metal oxide of Example 1 (150.1 mg, 60-80 mesh size) with 200 μL of SAPO-34 (128.3 mg, 60-80 mesh size) and shaking for 30 see until well mixed.

The hybrid catalyst formed as disclosed above was placed in a reactor zone and reacted with a feed gas having the conditions shown in Table 1 above.

The resulting conversion and selectivity achieved is shown in Table 4 below:

TABLE 4

|  | Conv., Cmol % | Selectivity, C mol % | | | | | |
|---|---|---|---|---|---|---|---|
|  |  | $CO_2$ | Oxygenates | $CH_4$ | $C_2H_6$ | Propane | $C_4$ paraffins | $C_5$ paraffins |
| Condition 3 | 31.7 | 43.2 | 0.0 | 4.9 | 6.7 | 30.1 | 9.1 | 0.0 |

TABLE 4-continued

| | Selectivity, C mol % | | | |
|---|---|---|---|---|
| | Ethylene | Propylene | $C_4$ olefins | $C_5$ olefins |
| Condition 3 | 2.2 | 0.0 | 3.9 | 0.0 |

The productivity and selectivity of $C_2$ to $C_5$ paraffins achieved is shown in Table 5 below:

TABLE 5

| | Productivity, g/kg_cat/h | | Selectivity, C mol % | | | |
|---|---|---|---|---|---|---|
| | $C_2$-$C_5$ paraffins | $C_2$-$C_5$ olefins | $C_2$-$C_5$ paraffins | $C_2$-$C_5$ olefins | $CH_4$ | Paraffins fraction, % |
| Condition 3 | 75.9 | 9.5 | 45.9 | 6.1 | 4.9 | 80.7 |

Example 3

A metal oxide catalyst component comprising gallium and a titanium oxide support was prepared by an incipient wetness impregnation method. A stock solution of gallium (III) nitrate hexahydrate with C=1.5 M in DI water was prepared, and 0.765 mL of the stock solution were mixed with 0.381 mL of DI water to obtain 1.146 mL of the impregnation solution. Then 564.4 mg of 60-80 mesh size $TiO_2$ support (available as NORPRO ST61120, BET surface area=130 m²/g, 100% anatase phase by XRD, pore volume=0.57 mL/g measured by DI water) was weighed and placed into a glass vial. After that, 323.4 μL of the impregnation solution were added dropwise to the support while constantly shaking. After impregnation, the metal oxide catalyst component was dried at 120° C. in the oven (static air) and calcined using the following program: room temperature heated to 120° C. at a heating rate of 2° C./min, held at 120° C. for 2 h, heated from 120° C. to 500° C. at a heating rate of 3° C./min, held at 500° C. for 4 h, cooled down to room temperature in 2 h. After calcination the catalyst was re-sieved to 60-80 mesh size to remove fine particles.

The metal oxide catalyst component has the following elemental composition (measured by XRF): 3.33 wt % Ga, 56.7 wt % Ti, 0.146 wt % S and 0.05 wt % P, balance—oxygen.

A hybrid catalyst was prepared by combining 150 μL of the metal oxide catalyst component disclosed above (103.7 mg, 60-80 mesh size) with 150 μL of SAPO-34 (81.4 mg, 60-80 mesh size) and shaking for 30 see until well mixed.

The resulting conversion and selectivity achieved is shown in Table 6 below:

TABLE 6

| | Conv., Cmol % | Selectivity, C mol % | | | | | | |
|---|---|---|---|---|---|---|---|---|
| | | $CO_2$ | Oxygenates | $CH_4$ | $C_2H_6$ | Propane | $C_4$ paraffins | $C_5$ paraffins |
| Condition 4 | 26.0 | 47.1 | 0.0 | 9.2 | 7.5 | 26.9 | 6.8 | 0.0 |
| Condition 2 | 37.7 | 45.7 | 0.0 | 7.5 | 5.9 | 31.9 | 7.0 | 0.0 |

| | Selectivity, C mol % | | | |
|---|---|---|---|---|
| | Ethylene | Propylene | $C_4$ olefins | $C_5$ olefins |
| Condition 4 | 2.1 | 0.0 | 0.4 | 0.0 |
| Condition 2 | 1.9 | 0.0 | 0.2 | 0.0 |

The productivity and selectivity of $C_2$ to $C_5$ paraffins achieved is shown in Table 7 below:

TABLE 7

| | Productivity, g/kg_cat/h | | Selectivity, C mol % | | | |
|---|---|---|---|---|---|---|
| | $C_2$-$C_5$ paraffins | $C_2$-$C_5$ olefins | $C_2$-$C_5$ paraffins | $C_2$-$C_5$ olefins | $CH_4$ | Paraffins fraction, % |
| Condition 4 | 41.3 | 2.4 | 41.2 | 2.5 | 9.2 | 94.3 |
| Condition 2 | 48.7 | 2.0 | 44.8 | 2.1 | 7.5 | 82.4 |

Example 4

A metal oxide catalyst component comprising gallium promoted by palladium supported on zirconia was prepared by an incipient wetness impregnation method. A stock solution of gallium (III) nitrate hexahydrate with C=1.5 M in DI water was prepared. A stock solution of palladium (II) nitrate dihydrate with C=0.5 M in DI water was prepared. Subsequently, 0.66 mL of the gallium nitrate stock solution were mixed with 0.39 mL of the palladium nitrate stock solution and with 0.265 mL of DI water to obtain 1.32 mL of the impregnation solution. Then, 965.3 mg of 60-80 mesh size $ZrO_2$ support (available as NORPRO SZ39114, BET surface area=50 $m^2/g$, 100% monoclinic phase measured by XRD, pore volume=0.443 mL/g measured by DI water) was weighed and placed into a glass vial. After that, 427.6 μL of the impregnation solution were added dropwise to the support while constantly shaking. After impregnation, the metal oxide catalyst component was dried at 120° C. in the oven (static air) and calcined using the following program: heating from room temperature to 120° C. at a heating rate of 2° C./min, held at 120° C. for 2 h, heated from 120° C. to 400° C. at a heating rate of 3° C./min, held at 400° C. for 4 h, cooled down to room temperature in 2 h. After calcination the catalyst was re-sieved to 60-80 mesh size to remove fine particles.

The metal oxide catalyst component has the following elemental composition (measured by XRF): 2.03 wt % Ga, 0.75% Pd, 68.7 wt % Zr, 2.4% Hf, balance—oxygen.

A hybrid catalyst was prepared by combining 150 μL of the metal oxide catalyst component disclosed above (103.7 mg, 60-80 mesh size) with 150 μL of SAPO-34 (81.4 mg, 60-80 mesh size) and shaking for 30 see until well mixed. The hybrid catalyst was activated in 10 vol % $H_2$ in $N_2$ using the following procedure: pressure of 3 bar, gas flow rate of 6 mL/min (STP), temperature 25° C. heated to 400° C. at a heating rate of 2° C./min, held at 400° C. for 3 hrs.

The resulting conversion and selectivity achieved is shown in Table 8 below:

Example 5

A metal oxide catalyst component comprising gallium promoted by nickel supported on zirconia was prepared by an incipient wetness co-impregnation method. A stock solution of gallium (III) nitrate nonahydrate and nickel (II) hexahydrate with C=2 M in DI water was prepared. Subsequently, 1 mL of the gallium nitrate stock solution and 0.3 mL of the nickel nitrate solution were mixed with 0.7 mL of DI water to obtain 2 mL of the impregnation solution. Then, 1000 mg of 60-80 mesh size $ZrO_2$ support (available as NORPRO SZ31164, BET surface area=98 $m^2/g$, 100% monoclinic phase measured by XRD, pore volume=0.44 mL/g measured by DI water) was weighed and placed into a glass vial. After that, 0.4 mL of the impregnation solution were added dropwise to the support while constantly shaking. After impregnation, the metal oxide catalyst component was dried and calcined in air (muffle furnace) using the following program: heating from room temperature to 120° C. at a heating rate of 2° C./min, held at 120° C. for 5 h, heated from 120° C. to 550° C. at a heating rate of 3° C./min, held at 550° C. for 4 h, cooled down to room temperature (furnace cooling) over night. After calcination, the metal oxide catalyst component was re-sieved to 60-80 mesh size to remove fine particles.

The metal oxide catalyst component has the following elemental composition (measured by XRF): 3.4 wt % Ga, 0.7 wt % Ni, 67.8 wt % Zr, 2.3% Hf, balance—oxygen.

A hybrid catalyst was prepared by combining 200 μL of the metal oxide catalyst component disclosed above (204.93 mg, 60-80 mesh size) with 200 μL of SAPO-34 (128.1 mg, 60-80 mesh size) and shaken for 30 see until well mixed.

The resulting conversion and selectivity achieved is shown in Table 10 below:

TABLE 8

| | Conv., Cmol % | Selectivity, C mol % | | | | | | |
|---|---|---|---|---|---|---|---|---|
| | | $CO_2$ | Oxygenates | $CH_4$ | $C_2H_6$ | Propane | $C_4$ paraffins | $C_5$ paraffins |
| Condition 5 | 48.6 | 45.1 | 0.0 | 1.6 | 23.1 | 25.2 | 4.5 | 0.0 |

| | Selectivity, C mol % | | | |
|---|---|---|---|---|
| | Ethylene | Propylene | $C_4$ olefins | $C_5$ olefins |
| Condition 5 | 0.3 | 0.0 | 0.1 | 0.0 |

The productivity and selectivity of $C_2$ to $C_5$ paraffins achieved is shown in Table 9 below:

TABLE 9

| | Productivity, g/kg_cat/h | | Selectivity, C mol % | | | |
|---|---|---|---|---|---|---|
| | $C_2$-$C_5$ paraffins | $C_2$-$C_5$ olefins | $C_2$-$C_5$ paraffins | $C_2$-$C_5$ olefins | $CH_4$ | Paraffins fraction, % |
| Condition 5 | 52 | 0.5 | 52.8 | 0.4 | 1.6 | 96.4 |

TABLE 10

| | Conv., Cmol % | Selectivity, C mol % | | | | | | |
|---|---|---|---|---|---|---|---|---|
| | | $CO_2$ | Oxygenates | $CH_4$ | $C_2H_6$ | Propane | $C_4$ paraffins | $C_5$ paraffins |
| Condition 6 | 74.9 | 35.9 | 0.4 | 2.8 | 20.6 | 31.4 | 8.5 | 0.0 |

| | Selectivity, C mol % | | | |
|---|---|---|---|---|
| | Ethylene | Propylene | $C_4$ olefins | $C_5$ olefins |
| Condition 6 | 0.0 | 0.0 | 0.8 | 0.0 |

The productivity and selectivity of $C_2$ to $C_5$ paraffins achieved is shown in Table 11 below:

TABLE 11

| | Productivity, g/kg_cat/h | | Selectivity, C mol % | | | |
|---|---|---|---|---|---|---|
| | $C_2$-$C_5$ paraffins | $C_2$-$C_5$ olefins | $C_2$-$C_5$ paraffins | $C_2$-$C_5$ olefins | $CH_4$ | Paraffins fraction, % |
| Condition 6 | 194.6 | 0.1 | 60.5 | 0.8 | 2.8 | 94.4 |

Example 6

A metal oxide catalyst component comprising gallium promoted by palladium supported on zirconia was prepared by sequential incipient wetness impregnation method. An impregnation solution of gallium (III) nitrate nonahydrate with C=1 M in DI water was prepared. An impregnation solution of Pd(NH$_3$)$_4$NO$_3$ with 0.026 mol/L was prepared by diluting 1.687 mL of 10 wt % Pd(NH$_3$)$_4$NO$_3$ (available from Sigma-Aldrich) stock solution to 25 mL with DI. Then, 3 g of 60-80 mesh size ZrO$_2$ support (available as NORPRO SZ31164, BET surface area=98 m$^2$/g, 100% monoclinic phase by XRD, pore volume=0.44 mL/g measured by DI water) was weighed and placed into a glass vial. After that, 1.2 mL of the Ga nitrate impregnation solution was added dropwise to the support while constantly shaking. After impregnation, the metal oxide catalyst component was dried and calcined in air (muffle furnace) using the following program: heating from room temperature to 120° C. at a heating rate of 2° C./min, held at 120° C. for 5 h, heated from 120° C. to 550° C. at a heating rate of 3° C./min, held at 550° C. for 4 h, cooled down to room temperature (furnace cooling) overnight. Subsequently, 1 g of the gallium impregnated zirconia was weighed and placed into a glass vial. 0.4 mL of the Pd impregnation solution was added dropwise to the support while constantly shaking. After impregnation, the metal oxide catalyst component was dried and calcined in air (muffle furnace) using the following program: heating from room temperature to 120° C. at a heating rate of 2° C./min, held at 120° C. for 5 h, heated from 120° C. to 400° C. at a heating rate of 2° C./min, held at 400° C. for 2 h, cooled down to room temperature (furnace cooling) overnight. After calcination the catalyst was re-sieved to 60-80 mesh size to remove fine particles.

The metal oxide catalyst component has the following elemental composition (measured by XRF): 3.3 wt % Ga, 0.126 wt % Pd, 68 wt % Zr, 2.3% Hf, balance—oxygen.

A hybrid catalyst was prepared by combining 200 μL of the metal oxide catalyst component disclosed above (208.83 mg, 60-80 mesh size) with 200 μL of SAPO-34 (134.5 mg, 60-80 mesh size) and shaken for 30 sec until well mixed.

The resulting conversion and selectivity achieved is shown in Table 12 below:

TABLE 12

| | Conv., Cmol % | Selectivity, C mol % | | | | | | |
|---|---|---|---|---|---|---|---|---|
| | | $CO_2$ | Oxygenates | $CH_4$ | $C_2H_6$ | Propane | $C_4$ paraffins | $C_5$ paraffins |
| Condition 6 | 75.7 | 36.2 | 0.4 | 1.06 | 19.1 | 33.2 | 9.6 | 0.0 |

| | Selectivity, C mol % | | | |
|---|---|---|---|---|
| | Ethylene | Propylene | $C_4$ olefins | $C_5$ olefins |
| Condition 6 | 0.0 | 0.0 | 0.7 | 0.0 |

The productivity and selectivity of $C_2$ to $C_5$ paraffins achieved is shown in Table 13 below:

TABLE 13

| | Productivity, g/kg_cat/h | | Selectivity, C mol % | | | |
|---|---|---|---|---|---|---|
| | $C_2$-$C_5$ paraffins | $C_2$-$C_5$ olefins | $C_2$-$C_5$ paraffins | $C_2$-$C_5$ olefins | $CH_4$ | Paraffins fraction, % |
| Condition 6 | 191.2 | 0.1 | 62.0 | 0.7 | 1.06 | 97.2 |

Example 7

A metal oxide catalyst component comprising gallium promoted by platinum supported on zirconia was prepared by sequential incipient wetness impregnation method. An impregnation solution of gallium (III) nitrate nonahydrate with C=1 M in DI water was prepared. An impregnation solution of $PtCl_4(NH_4)_2$ with 0.026 mol/L was prepared by dissolving 0.0958 g of $PtCl_4(NH_4)_2$ (available from Sigma Aldrich) powder in 20 mL DI. Then, 3 g of 60-80 mesh size $ZrO_2$ support (available as NORPRO SZ31164, BET surface area=98 $m^2$/g, 100% monoclinic phase measured by XRD, pore volume=0.44 mL/g measured by DI water) was weighed and placed into a glass vial. After that, 1.2 mL of the Ga nitrate impregnation solution was added dropwise to the support while constantly shaking. After impregnation, the metal oxide catalyst component was dried and calcined in air (muffle furnace) using the following program: heating form room temperature to 120° C. at a heating rate of 2° C./min, held at 120° C. for 5 h, heated from 120° C. to 550° C. at a heating rate of 3° C./min, held at 550° C. for 4 h, cooled down to room temperature (furnace cooling) overnight. Subsequently, 1 g of the gallium impregnated zirconia was weighed and placed into a glass vial. Then, 0.4 mL of the Pt impregnation solution was added dropwise to the support while constantly shaking. After impregnation, the metal oxide catalyst component was dried and calcined in air (muffle furnace) using the following program: heated from room temperature to 120° C. at a heating rate of 2° C./min, held at 120° C. for 5 h, heated from 120° C. to 400° C. at a heating rate of 2° C./min, held at 400° C. for 2 h, cooled down to room temperature (furnace cooling) overnight.

After calcination the metal oxide catalyst component was re-sieved to 60-80 mesh size to remove fine particles.

The metal oxide catalyst component has the following elemental composition (measured by XRF): 3.5 wt % Ga, 0.21 wt % Pt, 67.6 wt % Zr, 2.3% Hf, balance—oxygen.

A hybrid catalyst was prepared by combining 200 μL of the metal oxide catalyst component disclosed above (207.72 mg, 60-80 mesh size) with 200 μL of SAPO-34 (135.08 mg, 60-80 mesh size) and shaken for 30 sec until well mixed.

The resulting conversion and selectivity achieved is shown in Table 14 below:

TABLE 14

| | Conv., Cmol % | Selectivity, C mol % | | | | | | |
|---|---|---|---|---|---|---|---|---|
| | | $CO_2$ | Oxygenates | $CH_4$ | $C_2H_6$ | Propane | $C_4$ paraffins | $C_5$ paraffins |
| Condition 6 | 76.8 | 33.8 | 0.1 | 1.0 | 19.2 | 36.3 | 8.0 | 0.0 |

| | Selectivity, C mol % | | | |
|---|---|---|---|---|
| | Ethylene | Propylene | $C_4$ olefins | $C_5$ olefins |
| Condition 6 | 0.4 | 0.0 | 1.1 | 0.1 |

The productivity and selectivity of $C_2$ to $C_5$ paraffins achieved is shown in Table 15 below:

TABLE 15

| | Productivity, g/kg_cat/h | | Selectivity, C mol % | | | |
|---|---|---|---|---|---|---|
| | $C_2$-$C_5$ paraffins | $C_2$-$C_5$ olefins | $C_2$-$C_5$ paraffins | $C_2$-$C_5$ olefins | $CH_4$ | Paraffins fraction, % |
| Condition 6 | 199.0 | 1.2 | 63.6 | 1.5 | 1.0 | 96.2 |

Comparative Example 1

Commercially available bulk $In_2O_3$ (available from Sigma Aldrich) was used as the metal oxide catalyst component. The indium oxide was pelletized, crushed, and sieved to 60-80 mesh size prior to use.

A hybrid catalyst was prepared by mixing 150 μL of the metal oxide catalyst component disclosed above (200.9 mg, 60-80 mesh size) with 150 μL of SAPO-34 (87.0 mg, 60-80 mesh size) and shaken for 30 sec until well mixed.

The resulting conversion and selectivity achieved is shown in Table 16 below:

TABLE 16

| | Conv., Cmol % | Selectivity, C mol % | | | | | |
|---|---|---|---|---|---|---|---|
| | | $CO_2$ | Oxygenates | $CH_4$ | $C_2H_6$ | Propane | $C_4$ paraffins | $C_5$ paraffins |
| Condition 7 | 28.2 | 51.1 | 0.0 | 2.3 | 4.9 | 4.7 | 0.8 | 0.0 |
| Condition 8 | 1.3 | 48.1 | 0.0 | 22.8 | 2.4 | 5.6 | 0.0 | 0.0 |

| | Selectivity, C mol % | | | |
|---|---|---|---|---|
| | Ethylene | Propylene | $C_4$ olefins | $C_5$ olefins |
| Condition 7 | 11.3 | 23.7 | 1.2 | 0 |
| Condition 8 | 14.3 | 6.7 | 0.0 | 0 |

The productivity and selectivity of $C_2$ to $C_5$ paraffins achieved is shown in Table 17 below:

TABLE 17

| | Productivity, g/kg_cat/h | | Selectivity, C mol % | | | |
|---|---|---|---|---|---|---|
| | $C_2$-$C_5$ paraffins | $C_2$-$C_5$ olefins | $C_2$-$C_5$ paraffins | $C_2$-$C_5$ olefins | $CH_4$ | Paraffins fraction, % |
| Condition 7 | 0.28 | 0.6 | 10.4 | 36.2 | 2.3 | 21.3 |
| Condition 8 | 7.1 | 23.4 | 8.0 | 21.0 | 22.8 | 15.4 |

Comparative Example 2

A metal oxide catalyst component comprising gallium on a zirconia support was prepared by an incipient wetness impregnation method. A stock solution of gallium (III) nitrate hexahydrate with C=1.5 M in DI water was prepared. 956.2 μL of the gallium nitrate stock solution were mixed with 151.3 μL of DI water to obtain 1107.5 μL of the impregnation solution. Then, 1068.3 mg of 60-80 mesh size $ZrO_2$ support (available as NORPRO SZ39114, BET surface area=50 m²/g, 100% monoclinic phase by XRD, pore volume=0.443 mL/g measured by DI water) was weighed and placed into a glass vial. After that, 473.3 μL of the impregnation solution were added dropwise to the support while constantly shaking. After impregnation catalyst was dried at 120° C. in the oven (static air) and calcined using the following program: heating from room temperature to 150° C. at a heating rate of 2° C./min, held at 150° C. for 1 h, heated from 150° C. to 500° C. at 3° C./min, held at 500° C. for 4 h, cooled down to room temperature in 2 h. After calcination the catalyst was re-sieved to 60-80 mesh size to remove fine particles.

The metal oxide catalyst component has the following elemental composition (measured by XRF): 3.02 wt % Ga, 68.2 wt % Zr, 2.3% Hf, balance—oxygen.

A hybrid catalyst was prepared by combining 200 μL of the metal oxide catalyst component disclosed above (220.0 mg, 60-80 mesh size) with 200 μL of SAPO-34 (126.8 mg, 60-80 mesh size) and shaken for 30 see until well mixed.

The resulting conversion and selectivity achieved is shown in Table 18 below:

TABLE 18

| | Conv., Cmol % | Selectivity, C mol % | | | | | |
|---|---|---|---|---|---|---|---|
| | | $CO_2$ | Oxygenates | $CH_4$ | $C_2H_6$ | Propane | $C_4$ paraffins | $C_5$ paraffins |
| Condition 3 | 74.5 | 35.5 | 0.0 | 1.7 | 5.0 | 23.5 | 2.8 | 0.0 |

| | Selectivity, C mol % | | | |
|---|---|---|---|---|
| | Ethylene | Propylene | $C_4$ olefins | $C_5$ olefins |
| Condition 3 | 4.6 | 21.2 | 5.8 | 0.0 |

The productivity and selectivity of $C_2$ to $C_5$ paraffins achieved is shown in Table 19 below:

TABLE 19

| | Productivity, g/kg_cat/h | | Selectivity, C mol % | | | |
|---|---|---|---|---|---|---|
| | $C_2$-$C_5$ paraffins | $C_2$-$C_5$ olefins | $C_2$-$C_5$ paraffins | $C_2$-$C_5$ olefins | $CH_4$ | Paraffins fraction, % |
| Condition 3 | 94.0 | 89.9 | 31.3 | 31.6 | 1.7 | 48.5 |

Comparative Example 3

A metal oxide catalyst component comprising gallium and a zirconia support was prepared by an incipient wetness impregnation method. In total, 3 impregnation steps with an intermediate drying step were required to achieve the desired Ga loading. A stock solution of gallium (III) nitrate hexahydrate with C=1.5 M in DI water was prepared. 1912.4 µL of the gallium nitrate stock solution were mixed with 302.6 µL of DI water to obtain 2215 µL of the impregnation solution. Then 1150.6 mg of 60-80 mesh size $ZrO_2$ support (available as NORPRO SZ39114, BET surface area=50 $m^2$/g, 100% monoclinic phase measured by XRD, pore volume=0.443 mL/g measured by DI water) was weighed and placed into a glass vial. After that, 509.7 µL of the impregnation solution were added dropwise to the support while constantly shaking (impregnation #1). After this impregnation, the metal oxide catalyst component was dried at 150° C. in the oven (static air) for 1 h followed by the dropwise addition of another 509.7 µL of the impregnation solution (impregnation #2). The metal oxide catalyst component was dried at 150° C. in the oven followed by the dropwise addition of another 509.7 µL of the impregnation solution (impregnation #3). The metal oxide catalyst component was calcined in air (box oven) using the following program: heated form 150° C. to 500° C. at 3° C./min, held at 500° C. for 4 h, cooled down to room temperature in 2 h. After calcination the catalyst was re-sieved to 60-80 mesh size to remove fine particles.

The metal oxide catalyst component has the following elemental composition (measured by XRF): 8.0 wt % Ga, 63.4 wt % Zr, 2.2% Hf, balance—oxygen.

A hybrid catalyst was prepared by combining 200 µL of the metal oxide catalyst component disclosed above (234.5 mg, 60-80 mesh size) with 200 µL of SAPO-34 (130.0 mg, 60-80 mesh size) and shaken for 30 see until well mixed.

The resulting conversion and selectivity achieved is shown in Table 20 below:

TABLE 20

| | Conv., Cmol % | Selectivity, C mol % | | | | | | |
|---|---|---|---|---|---|---|---|---|
| | | $CO_2$ | Oxygenates | $CH_4$ | $C_2H_6$ | Propane | $C_4$ paraffins | $C_5$ paraffins |
| Condition 3 | 71.7 | 35.9 | 0.0 | 1.7 | 4.9 | 27.6 | 3.3 | 0.0 |

| | Selectivity, C mol % | | | |
|---|---|---|---|---|
| | Ethylene | Propylene | $C_4$ olefins | $C_5$ olefins |
| Condition 3 | 4.2 | 16.9 | 5.4 | 0.0 |

The productivity and selectivity of $C_2$ to $C_5$ paraffins achieved is shown in Table 21 below:

TABLE 21

| | Productivity, g/kg_cat/h | | Selectivity, C mol % | | | |
|---|---|---|---|---|---|---|
| | $C_2$-$C_5$ paraffins | $C_2$-$C_5$ olefins | $C_2$-$C_5$ paraffins | $C_2$-$C_5$ olefins | $CH_4$ | Paraffins fraction, % |
| Condition 3 | 99.2 | 69.5 | 35.8 | 26.5 | 1.7 | 55.9 |

Comparative Example 4

A metal oxide catalyst component comprising gallium and a zirconia support was prepared by incipient wetness impregnation method. A stock solution of gallium (III) nitrate hexahydrate with C=1.23 M in DI water was prepared. 650.4 µL of the gallium nitrate stock solution were mixed with 150.0 µL of DI water to obtain 800.4 µL of the impregnation solution. Then, 2000 mg of 60-80 mesh size $ZrO_2$ support (available as NORPRO SZ31164, BET surface area=98 m$^2$/g, 100% monoclinic phase measured by XRD, pore volume=0.44 mL/g measured by DI water) was weighed and placed into a glass vial. After that, 800 µL of the impregnation solution were added dropwise to the support while constantly shaking. After impregnation, the metal oxide catalyst component was dried at 120° C. in the oven (static air) overnight followed by the dropwise addition of 700 µL of DI water. The material was dried and calcined in air (box oven) using the following program: heating from room temperature to 120° C. at 2° C./min, held at 120° C. for 2 h, heated from 120° C. to 550° C. at 3° C./min, held at 550° C. for 4 h, cooled down to room temperature in 2 h. After calcination the catalyst was re-sieved to 60-80 mesh size to remove fine particles.

The metal oxide catalyst component has the following elemental composition (measured by XRF): 2.9 wt % Ga, 68.4 wt % Zr, 2.2% Hf, balance—oxygen.

A hybrid catalyst was prepared by combining 200 µL of the metal oxide catalyst component disclosed above (169.6 mg, 60-80 mesh size) with 200 µL of SAPO-34 (130.2 mg, 60-80 mesh size) and shaken for 30 see until well mixed.

The resulting conversion and selectivity achieved is shown in Table 22 below:

TABLE 22

| | Conv., Cmol % | Selectivity, C mol % | | | | | |
|---|---|---|---|---|---|---|---|
| | | $CO_2$ | Oxygenates | $CH_4$ | $C_2H_6$ | Propane | $C_4$ paraffins | $C_5$ paraffins |
| Condition 3 | 75.8 | 36.1 | 0.0 | 1.3 | 4.8 | 22.1 | 2.6 | 0.0 |

| | Selectivity, C mol % | | | |
|---|---|---|---|---|
| | Ethylene | Propylene | $C_4$ olefins | $C_5$ olefins |
| Condition 3 | 5.1 | 22.2 | 5.7 | 0.0 |

The productivity and selectivity of $C_2$ to $C_5$ paraffins achieved is shown in Table 23 below:

TABLE 23

| | Productivity, g/kg_cat/h | | Selectivity, C mol % | | | |
|---|---|---|---|---|---|---|
| | $C_2$-$C_5$ paraffins | $C_2$-$C_5$ olefins | $C_2$-$C_5$ paraffins | $C_2$-$C_5$ olefins | $CH_4$ | Paraffins fraction, % |
| Condition 3 | 104.8 | 110.5 | 29.5 | 33.0 | 1.3 | 46.2 |

Comparative Example 5

A metal oxide catalyst component comprising gallium and a silica support was prepared by incipient wetness impregnation method. A stock solution of gallium (III) nitrate hexahydrate with C=1.5 M in DI water was prepared. 305.6 µL of the gallium nitrate stock solution were mixed with 654.0 µL of DI water to obtain 960.0 µL of the impregnation solution. Then, 446.2 mg of 60-80 mesh size $SiO_2$ support (amorphous silica Davidson 57, BET surface area=295 m$^2$/g, pore volume=1.2 mL/g measured by DI water) was weighed and placed into a glass vial. After that 535 µL of the impregnation solution were added dropwise to the support while constantly shaking. After impregnation, the metal oxide catalyst component was dried and calcined in the oven (static air) using the following program: heated from room temperature to 150° C. at a heating rate of 2° C./min, held at 150° C. for 3 h, heated from 150° C. to 500° C. at 3° C./min, held at 500° C. for 4 h, cooled down to room temperature in 2 h. After calcination the catalyst was re-sieved to 60-80 mesh size to remove fine particles.

The metal oxide catalyst component has the following elemental composition (measured by XRF): 3.6 wt % Ga, 44.3 wt % Si, balance—oxygen.

A hybrid catalyst was prepared by combining 150 µL of the metal oxide catalyst component disclosed above (50.1. mg, 60-80 mesh size) with 150 µL of SAPO-34 (69.5 mg, 60-80 mesh size) and shaken for 30 see until well mixed.

The resulting conversion and selectivity achieved is shown in Table 24 below:

TABLE 24

| | Conv., Cmol % | Selectivity, C mol % | | | | | |
| --- | --- | --- | --- | --- | --- | --- | --- |
| | | $CO_2$ | Oxygenates | $CH_4$ | $C_2H_6$ | Propane | $C_4$ paraffins | $C_5$ paraffins |
| Condition 9 | 3.4 | 35.6 | 0.0 | 30.2 | 9.2 | 9.9 | 2.1 | 0.0 |

| | Selectivity, C mol % | | | |
| --- | --- | --- | --- | --- |
| | Ethylene | Propylene | $C_4$ olefins | $C_5$ olefins |
| Condition 9 | 9.3 | 3.7 | 0.0 | 0.0 |

The productivity and selectivity of $C_2$ to $C_5$ paraffins achieved is shown in Table 25 below:

TABLE 25

| | Productivity, g/kg_cat/h | | Selectivity, C mol % | | | |
| --- | --- | --- | --- | --- | --- | --- |
| | $C_2$-$C_5$ paraffins | $C_2$-$C_5$ olefins | $C_2$-$C_5$ paraffins | $C_2$-$C_5$ olefins | $CH_4$ | Paraffins fraction, % |
| Condition 9 | 2.8 | 1.9 | 21.2 | 13.0 | 30.2 | 32.9 |

Comparative Example 6

A metal oxide catalyst component comprising gallium promoted by nickel and supported by silica was prepared by an incipient wetness impregnation method. A stock solution of gallium (III) nitrate hexahydrate with C=1.5 M in DI water was prepared. A stock solution of nickel (II) nitrate hexahydrate in DI water with C=2.05 M was prepared. Subsequently, 206.8 µL of the gallium nitrate stock solution were mixed with 305.3 µL of the nickel nitrate stock solution and 394.0 µL of DI water to obtain 960.0 µL of the impregnation solution. Then 496.0 mg of 60-80 mesh size $SiO_2$ support (amorphous silica Davidson 57, BET surface area=295 m²/g, pore volume=1.2 mL/g measured by DI water) was weighed and placed into a glass vial. After that 595.2 µL of the impregnation solution were added dropwise to the support while constantly shaking. After impregnation the metal oxide catalyst component was dried and calcined in the oven (static air) using the following program: heated from room temperature to 150° C. at a heating rate of 2° C./min, held at 150° C. for 3 h, heated from 150° C. to 500° C. at 3° C./min, held at 500° C. for 4 h, cooled down to room temperature in 2 h. After calcination the catalyst was re-sieved to 60-80 mesh size to remove fine particles.

The metal oxide catalyst component has the following elemental composition (measured by XRF): 3.0 wt % Ga, 4.6 wt % Ni, 41.7 wt % Si, balance—oxygen.

A hybrid catalyst was prepared by combining 150 µL of the metal oxide catalyst component disclosed above (52.8 mg, 60-80 mesh size) with 150 µL of SAPO-34 (68.0 mg, 60-80 mesh size) and shaken for 30 see until well mixed.

The resulting conversion and selectivity achieved is shown in Table 26 below:

TABLE 26

| | Conv., Cmol % | Selectivity, C mol % | | | | | | |
| --- | --- | --- | --- | --- | --- | --- | --- | --- |
| | | $CO_2$ | Oxygenates | $CH_4$ | $C_2H_6$ | Propane | $C_4$ paraffins | $C_5$ paraffins |
| Condition 9 | 3.3 | 41.9 | 0.0 | 29.8 | 14.8 | 9.9 | 0.8 | 0.0 |

| | Selectivity, C mol % | | | |
| --- | --- | --- | --- | --- |
| | Ethylene | Propylene | $C_4$ olefins | $C_5$ olefins |
| Condition 9 | 2.1 | 0.6 | 0.0 | 0.0 |

The productivity and selectivity of $C_2$ to $C_5$ paraffins achieved is shown in Table 27 below:

TABLE 27

| | Productivity, g/kg_cat/h | | Selectivity, C mol % | | | |
|---|---|---|---|---|---|---|
| | $C_2$-$C_5$ paraffins | $C_2$-$C_5$ olefins | $C_2$-$C_5$ paraffins | $C_2$-$C_5$ olefins | $CH_4$ | Paraffins fraction, % |
| Condition 9 | 4.2 | 0.8 | 25.6 | 2.74 | 29.8 | 44.0 |

Comparative Example 7

A metal oxide catalyst component comprising gallium and a γ-$Al_2O_3$ support was prepared by a sequential incipient wetness impregnation method. An impregnation solution of gallium (III) nitrate nonahydrate with C=0.36 M in DI water was prepared. Then, 1 g of 60-80 mesh size γ-$Al_2O_3$ support (available as NORPRO, gamma phase measured by XRD, BET surface area=245 $m^2$/g, x, pore volume=1.1 mL/g measured by DI water) was weighed and placed into a glass vial. After that 1.1 mL of the Ga nitrate impregnation solution was added dropwise to the support while constantly shaking. After impregnation, the metal oxide catalyst component was dried and calcined in air (muffle furnace) using the following program: heated from room temperature to 120° C. at a heating rate of 2° C./min, held at 120° C. for 5 h, heated from 120° C. to 550° C. at a heating rate of 3° C./min, held at 550° C. for 4 h, cooled down to room temperature (furnace cooling) overnight. After calcination, the metal oxide catalyst component was re-sieved to 60-80 mesh size to remove fine particles.

The metal oxide catalyst component has the following elemental composition (measured by XRF): 4.8 wt % Ga, 49.3 wt % Al, 2.3% Hf, balance—oxygen.

A hybrid catalyst was prepared by combining 200 μL of metal oxide catalyst component disclosed above (104.4 mg, 60-80 mesh size) with 200 μL of SAPO-34 (134.4 mg, 60-80 mesh size) and shaken for 30 see until well mixed.

The resulting conversion and selectivity achieved is shown in Table 28 below:

TABLE 28

| | Conv., Cmol % | Selectivity, C mol % | | | | | | |
|---|---|---|---|---|---|---|---|---|
| | | $CO_2$ | Oxygenates | $CH_4$ | $C_2H_6$ | Propane | $C_4$ paraffins | $C_5$ paraffins |
| Condition 6 | 6.1 | 43.3 | 0 | 6 | 4.7 | 24.2 | 6.8 | 0.0 |

| | Selectivity, C mol % | | | |
|---|---|---|---|---|
| | Ethylene | Propylene | $C_4$ olefins | $C_5$ olefins |
| Condition 6 | 6.5 | 4.3 | 4.2 | 0.0 |

The productivity and selectivity of $C_2$ to $C_5$ paraffins achieved is shown in Table 29 below:

TABLE 29

| | Productivity, g/kg_cat/h | | Selectivity, C mol % | | | |
|---|---|---|---|---|---|---|
| | $C_2$-$C_5$ paraffins | $C_2$-$C_5$ olefins | $C_2$-$C_5$ paraffins | $C_2$-$C_5$ olefins | $CH_4$ | Paraffins fraction, % |
| Condition 6 | 13.2 | 5.5 | 35.7 | 15 | 6 | 63.0 |

Summary of Examples

Examples 1 and 2 show that a hybrid catalyst comprised of bulk $Ga_2O_3$ and SAPO-34 is able to convert syngas to short chain paraffins with paraffin fraction in hydrocarbons over 70% on carbon basis.

Activity of Ga-containing oxide in hybrid catalyst can be improved by deposition of $Ga_2O_3$ onto high surface area $TiO_2$ support (Example 3). The hybrid catalyst Ga/$TiO_2$-SAPO-34 converts syngas to short chain paraffins with paraffins fraction greater than 80%.

Deposition of $Ga_2O_3$ onto other supports does not have same effect. Thus, Ga/$ZrO_2$—SAPO-34 catalysts (Comparative Example 2-4) are much less selective towards formation of paraffins and produce significant amount of olefins. Paraffin fraction in hydrocarbons does not exceed 50%.

Selectivity of Ga/$ZrO_2$ metal oxide catalyst component towards paraffins can be enhanced while maintaining low methane make by deposition of a secondary element which has a olefin hydrogenation activity: for example Pd, Pt, or Ni. Ga—Pd—Ga—Ni—or Ga—Pt/$ZrO_2$-SAPO-34 hybrid catalysts demonstrates high paraffin yield with paraffin fraction in hydrocarbons greater than 90% (Examples 4-7).

Comparative Example 5 shows that a deposition of Ga onto silica support does not result in the active mixed oxide component for hybrid catalyst: Ga/$SiO_2$—SAPO-34 has poor activity.

Comparative Example 6 shows that the addition of Ni to Ga/$SiO_2$ does not result in improved performance either in active mixed oxide for hybrid catalyst.

Comparative Example 7 shows that deposition of Ga onto γ-$Al_2O_3$ support does not result in active mixed oxide component for hybrid catalyst. Ga/$Al_2O_3$-SAPO-34 has poor activity.

Test Methodology

Catalyst Testing

Catalyst test were performed in a tubular stainless steel (inner diameter of 3 mm) or quartz (inner diameter of 2 mm) fixed-bed microreactor (placed in the stainless steel dome for pressurization). The bottom of the stainless steel reactor was equipped with a metal frit to hold the catalyst bed. The bottom of the quartz reactor was filled with quartz chips with a wool on top to hold the catalyst bed. A hybrid catalyst is loaded to a reactor and the following procedure was used for measuring catalytic activity in conversion of syngas. No activation step was required prior to catalyst testing unless specified otherwise in the description of examples and comparative examples above.

Syngas feed flow [$cm^3$/min STP] per reactor can be calculated using the formula:

$$F = \frac{GHSV \times V_{cat}}{60}$$

Where, GHSV is gas hourly space velocity [$h^{-1}$], $V_{cat}$ is a volume of hybrid catalyst (mL).

Reaction steps used in the examples and comparative examples are as follows:
1) $N_2$ flow, ambient pressure, temperature 25° C., heating to temperature set point from 25° C. at a heating rate of 5° C./min;
2) $N_2$ flow, ambient pressure is changed to pressure set point;
3) $N_2$ is replaced with syngas;
4) Syngas flushing for 1 hour at gas hourly space velocity specified in the Examples and Comparative examples;
5) GC analysis start up (defined as time on stream "zero");
6) Duration of the run is 70-200 h time on stream; and
7) Syngas replaced with $N_2$, cooling down to room temperature, end of the run Products were analyzed by means of the gas chromatography. Online analysis of components ($N_2$, $H_2$, He, CO, $CO_2$, paraffins (also referred to as alkanes) $C_1$-$C_5$, olefins $C_2$-$C_5$) was performed periodically to monitor the reaction progress. The carbon balance in all experiments was 100±5%.

Carbon Monoxide Conversion

Carbon monoxide conversion ($X_{CO}$ [Cmol %]) is defined herein as a percent of carbon in all hydrocarbons produced in the reaction zone to the total amount of carbon released from the reaction zone. The carbon monoxide conversion reported is measured as an average of all data points for a time-on-stream window specified in hours. The formula for calculating the carbon monoxide conversion for Examples 1-4 and Comparative Examples 1-7 is as follows in Equation 1:

$$X_{CO} = \frac{C_{prod}}{C_{total}} \times 100 \quad (1)$$

In Equation 1, $X_{CO}$ is the carbon monoxide conversion, $C_{prod}$ is the amount of carbon (mol/h) in hydrocarbons produced in the reaction zone, and $C_{total}$ is the total amount of carbon (mol/h) leaving the reaction zone.

The $c_{prod}$ is defined as follows in Equation 2:

$$c_{prod} = \Sigma n_i * F_i \quad (2)$$

where $n_i$ is number of carbon atoms in the i-product and $F_i$ is molar flow of i-product exiting the reaction zone (including $CO_2$).

The $c_{total}$ is defined as follows in Equation 3:

$$c_{total} = c_{prod} + F_{CO\_out} \quad (3)$$

where $F_{CO\_out}$ is a molar flow (mol/h) of carbon monoxide leaving the reaction zone.

Selectivity

The selectivity [Cmol %] of i-component for Examples 1-7 and Comparative Examples 1-7 is carbon selectivity defined herein as a percent of carbon in i-product produced in the reaction zone to the total amount of carbon in all products produced in the reaction zone. The selectivity of i-component is measured as an average of all data points for a time-on-stream period specified in the tables. The formula for calculating selectivity is as follows in Equation 4:

$$S_i = \frac{n_i * F_i}{C_{prod}} \times 100 \quad (4)$$

In Equation 4, $S_i$ is the selectivity of i-product, $n_i$ is the amount of carbon atoms in the i-product and $F_i$ is the molar flow (mol/h) of i-product exiting the reaction zone.

Paraffin Fraction

Paraffin fraction (%) is defined as total amount of carbon in $C_2$-$C_5$ paraffins leaving the reaction zone divided by the total amount of carbon in all hydrocarbons (including methane) leaving reaction zone per Equation (5):

$$PF = \frac{S_{C2-C5\ paraffins}}{S_{C2-C5\ paraffins} + S_{C2-C5\ olefins} + S_{methane}} \times 100 \quad (5)$$

Productivity

The productivity of the hybrid catalyst [g/kg_cat/h] Examples 1-7 and Comparative Examples 1-7 is the amount of $C_2$ to $C_5$ paraffins or $C_2$ to $C_5$ olefins produced compared to the amount of catalyst (mass) used to form the $C_2$ to $C_5$ paraffins or $C_2$ to $C_5$ olefins per unit of time. The productivity may be measured at a given time using the following Equation 6:

$$P_{C2-C5\ paraffins\ or\ C2-C5\ olefins} = \frac{\Sigma F_i * M_i}{m_{cat}} \quad (6)$$

In Equation 6, P is the productivity (g/kg_cat/h), $F_i$— is the molar flow of i-component (mol/h) exiting the reaction zone, $M_i$—molar mass of i-component (g/mol) and $m_{cat}$ is total hybrid catalyst mass (kg). Productivity values reported for a specified time-on-stream interval were calculated as average of all data points measured within the specified time-on-stream interval.

Carbon Balance

Carbon balance (CB [Cmol %] is the ratio between total amount of carbon entering the reaction zone in the form of carbon monoxide (mol/h) and leaving the reaction zone in the form of carbon monoxide and carbon-containing products. The formula for calculating the carbon balance is as follows in Equation 7:

$$CB = \frac{C_{total}}{F_{CO\_in}} \times 100 \qquad (7)$$

Where $c_{total}$ is total carbon flow [mol/h] leaving the reaction zone and calculated per Equation 3 and $F_{CO\_in}$ in molar flow of CO entering the reaction zone [mol/h].

In Examples 1-7 and Comparative Examples 1-7 the CB was 100±5%.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

The invention claimed is:

1. A method for preparing $C_2$ to $C_5$ paraffins comprising:
   introducing a feed stream comprising hydrogen gas and carbon monoxide into a reaction zone of a reactor; and
   converting the feed stream into a product stream comprising $C_2$ to $C_5$ paraffins in the reaction zone in the presence of a hybrid catalyst, the hybrid catalyst comprising:
   a microporous catalyst component; and
   a metal oxide catalyst component selected from the group consisting of:
   (A) a bulk material consisting of gallium oxide,
   (B) gallium oxide present on a titanium dioxide support material, and
   (C) a mixture of gallium oxide and at least one promoter present on a support material, the support material comprising at least one oxide of a metal selected from Group 4 of the IUPAC periodic table of elements.

2. The method of claim 1, wherein the metal oxide catalyst component is a bulk material consisting of gallium oxide.

3. The method of claim 1, wherein the metal oxide catalyst component is gallium oxide present on a titanium dioxide support material.

4. The method of claim 1, wherein the metal oxide catalyst component is a mixture of gallium oxide and at least one promoter present on a support material, the support material comprising an oxide of a metal selected from group 4 of the IUPAC periodic table of elements.

5. The method of claim 4, wherein the support material is selected from the group consisting of titanium dioxide ($TiO_2$), zirconium dioxide ($ZrO_2$), hafnium dioxide ($HfO_2$), and mixtures thereof.

6. The method of claim 4, wherein the support material is titanium dioxide.

7. The method of claim 4, wherein the support material is $ZrO_2$.

8. The method of claim 7, wherein the support material is monoclinic $ZrO_2$.

9. The method of claim 4, wherein the at least one promoter is a metal selected from group 10 of the IUPAC periodic table of elements.

10. The method of claim 4, wherein the at least one promoter is a metal selected from the group consisting of nickel (Ni), palladium (Pd), platinum (Pt), and mixtures thereof.

11. The method of claim 4, wherein a weight percent of the at least one promoter in the metal oxide catalyst component is from 0.01 wt % to 10.00 wt %.

12. The method of claim 3, wherein a weight percent of gallium in the metal oxide catalyst component is from 0.1 wt % to 10.0 wt %.

13. The method of claim 1, wherein the microporous catalyst component is a molecular sieve having 8-MR pore openings.

14. The method of claim 1, wherein the microporous catalyst component is SAPO-34.

15. The method of claim 1, wherein an amount of $C_2$ to $C_5$ paraffins as a carbon mol percent of a total $C_1$ to $C_5$ hydrocarbons in a product mixture is greater than or equal to 50 wt %.

16. The method of claim 4, wherein a weight percent of the at least one promoter in the metal oxide catalyst component is from 0.01 wt % to 10.00 wt %.

* * * * *